United States Patent [19]

Sukegawa et al.

[11] Patent Number: 5,603,001

[45] Date of Patent: Feb. 11, 1997

[54] SEMICONDUCTOR DISK SYSTEM HAVING A PLURALITY OF FLASH MEMORIES

[75] Inventors: Hiroshi Sukegawa; Yasunori Maki; Takashi Inagaki, all of Tokyo, Japan

[73] Assignee: Kabushiki Kaisha Toshiba, Kawasaka, Japan

[21] Appl. No.: 435,854

[22] Filed: May 5, 1995

[30] Foreign Application Priority Data

May 9, 1994 [JP] Japan .................................. 6-095125
May 9, 1994 [JP] Japan .................................. 6-095126

[51] Int. Cl.$^6$ .............................. G06F 12/00; G06F 13/00
[52] U.S. Cl. .............................................. 395/430; 395/404
[58] Field of Search .................................. 395/404, 405, 395/430, 185.01, 185.05, 839, 428, 441, 429, 182.04, 413, 439, 440, 483, 427

[56] References Cited

U.S. PATENT DOCUMENTS

| | | | |
|---|---|---|---|
| 5,357,475 | 10/1994 | Hasbun et al. | 395/430 |
| 5,361,343 | 11/1994 | Kosonocky et al. | 395/430 |
| 5,369,754 | 11/1994 | Frandrich et al. | 395/430 |
| 5,379,401 | 1/1995 | Robinson et al. | 395/430 |
| 5,428,569 | 6/1995 | Kato et al. | 365/185 |
| 5,437,020 | 7/1995 | Wells et al. | 395/182.04 |
| 5,459,850 | 10/1995 | Clay et al. | 395/497.02 |

Primary Examiner—Ayaz R. Sheikh
Assistant Examiner—Ario Etienne
Attorney, Agent, or Firm—Finnegan, Henderson, Farabow, Garrett & Dunner, L.L.P.

[57] ABSTRACT

A NAND bus interface independently receives 16 ready/busy signals from 16 flash EEPROM chips and thereby separately manages the operating states of these flash EEPROMs. Once a flash EEPROM as a write access target is set in a ready state, a write access to this write access target flash EEPROM is started without waiting for completion of the operations of all the flash EEPROMs. Each flash EEPROM is of a command control type capable of automatically executing a write operation. This allows parallel processing of the flash EEPROMs, i.e., a write access to a given EEPROM can be performed while a data write to another flash EEPROM is being executed. An ECC calculating circuit calculates a data string transferred in units of 256 bytes from a data buffer by a processor, and generates an ECC corresponding to that data string. The 256-byte data string is added with the generated ECC and transferred to a data register of a flash EEPROM. Even if abnormal cells are produced at the same bit position in a plurality of pages of a flash EEPROM, only one abnormal cell is contained in a data string as an object of the ECC calculation. This makes it possible to perform error detection and correction by a common simple ECC calculation without using any complicated ECC arithmetic expression with a high data recovery capability.

35 Claims, 22 Drawing Sheets

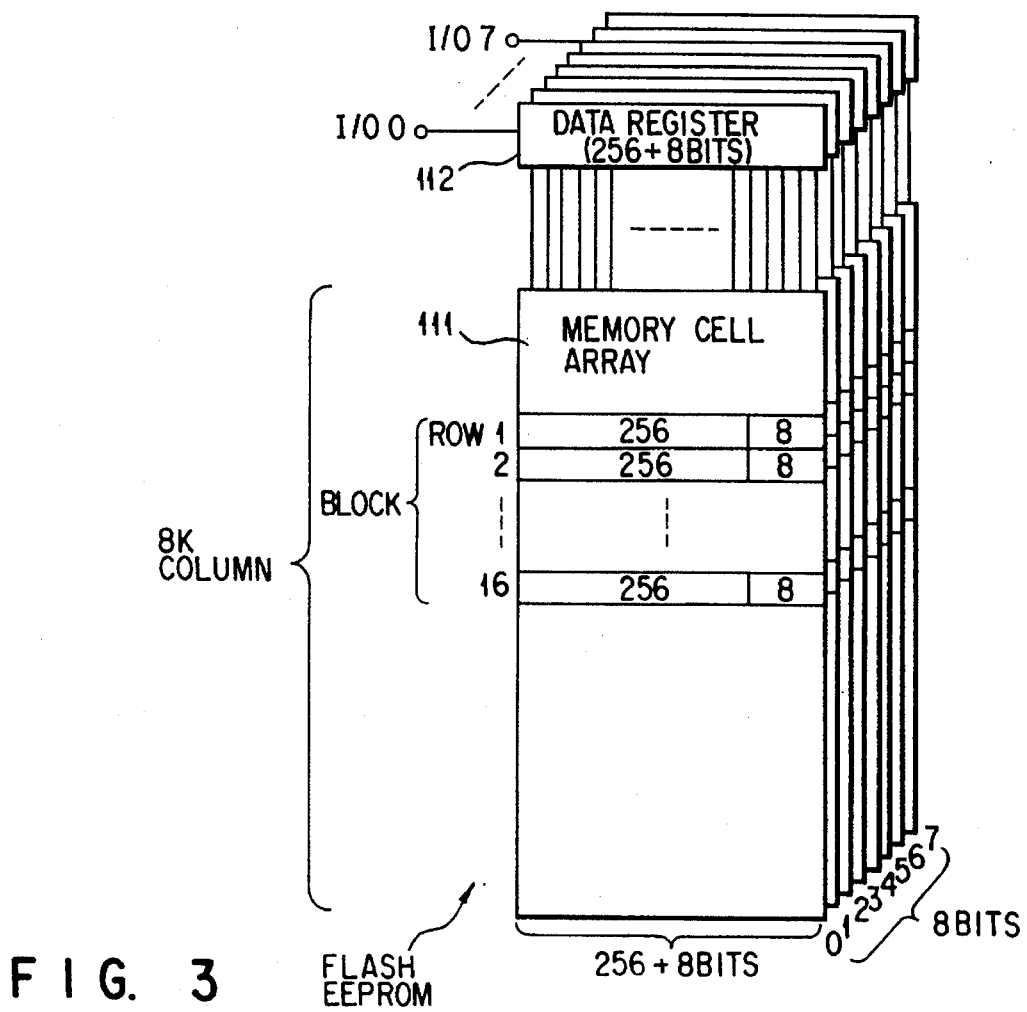
F I G. 3

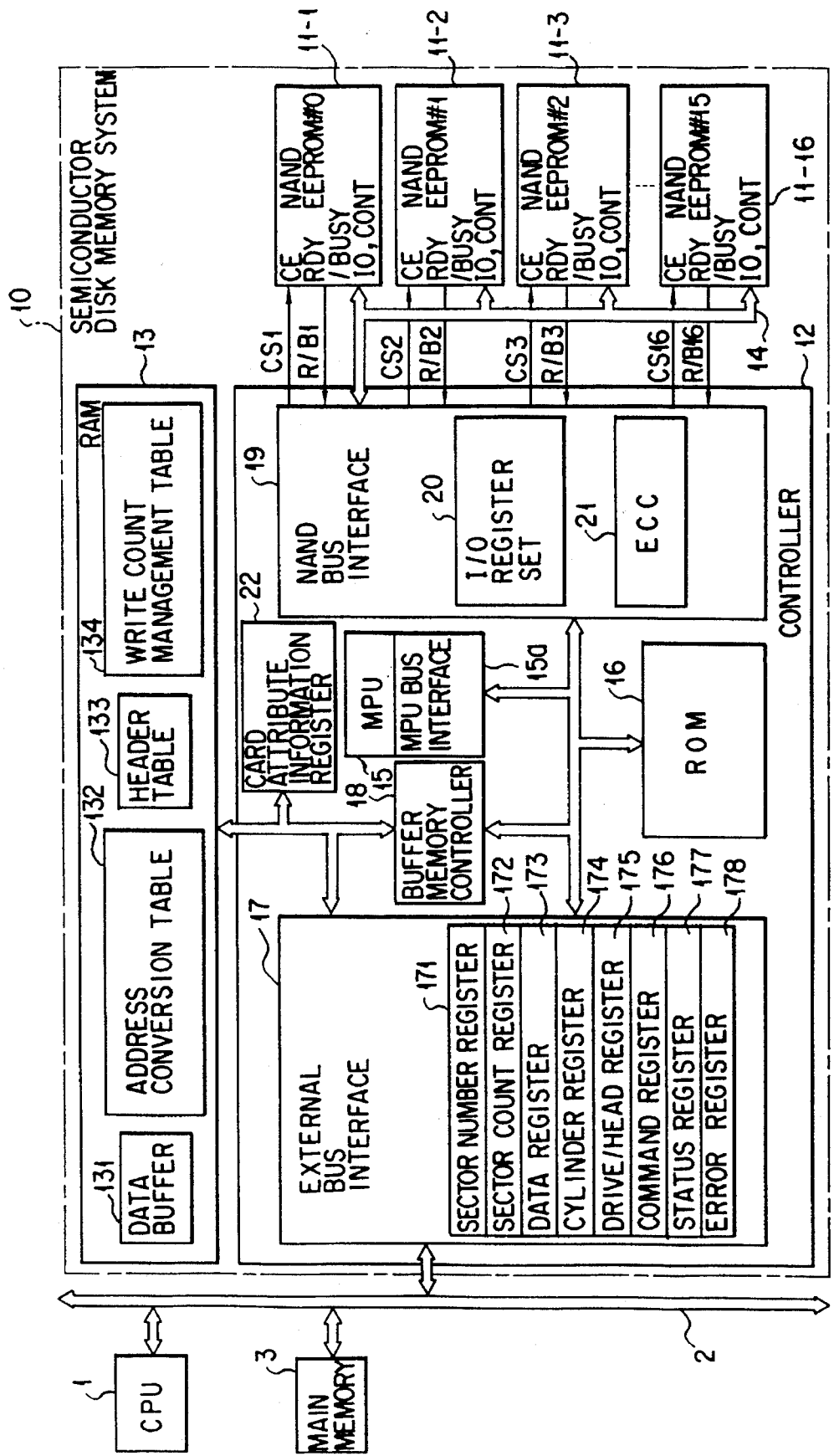
F I G. 2

| PAGE NO. | DATA AREA 256 BYTES | REDUNDANCY AREA 2 BYTES | | 6 BYTES |
|---|---|---|---|---|
| | | LWC | ECC ERROR INFORMATION | ECC |
| 0 | USER DATA (SECTOR 0 1/2) | BAD SECTOR INFORMATION | ECC ERROR INFORMATION | ECC |
| 1 | USER DATA (SECTOR 0 2/2) | – EMPTY – | | ECC |
| 2 | USER DATA (SECTOR 1 1/2) | BAD SECTOR INFORMATION | ECC ERROR INFORMATION | ECC |
| 3 | USER DATA (SECTOR 1 2/2) | – EMPTY – | | ECC |
| 4 | USER DATA (SECTOR 2 1/2) | BAD SECTOR INFORMATION | ECC ERROR INFORMATION | ECC |
| 5 | USER DATA (SECTOR 2 2/2) | – EMPTY – | | ECC |
| --- | --- | --- | --- | --- |
| 14 | USER DATA (SECTOR 7 1/2) | BAD SECTOR INFORMATION | ECC ERROR INFORMATION | ECC |
| 15 | USER DATA (SECTOR 7 2/2) | – EMPTY – | | ECC |

BLOCK 0

ABNORMAL CELL

MEMORY BLOCK
- BLOCK 0 (4K +128 BYTES)
- BLOCK 1 (4K +128 BYTES)
- ---
- BLOCK 502 (4K +128 BYTES)
- BLOCK 503 (4K +128 BYTES)

11-1 NAND EEPROM #0

F I G. 7

| ADDRESS ON MBI TABLE | 2 BYTES | |
|---|---|---|
| 001h, 000h | HOST ADDRESS CORRESPONDING TO PHYSICAL BLOCK ADDRESS 0 | ⎫ |
| 003h, 002h | UWC CORRESPONDING TO PHYSICAL BLOCK ADDRESS 0 | ⎬ PAGE 5 |
| 005h, 004h | HOST ADDRESS CORRESPONDING TO PHYSICAL BLOCK ADDRESS 1 | |
| 007h, 006h | UWC CORRESPONDING TO PHYSICAL BLOCK ADDRESS 1 | ⎭ |
| | ... | |
| | HOST ADDRESS CORRESPONDING TO PHYSICAL BLOCK ADDRESS 63 | ⎫ PAGE 6 |
| | UWC CORRESPONDING TO PHYSICAL BLOCK ADDRESS 63 | ⎬ ~ |
| | ... | |
| | HOST ADDRESS CORRESPONDING TO PHYSICAL BLOCK ADDRESS 448 | |
| | UWC CORRESPONDING TO PHYSICAL BLOCK ADDRESS 448 | ⎭ PAGE 11 |
| | HOST ADDRESS CORRESPONDING TO PHYSICAL BLOCK ADDRESS 449 | ⎫ |
| | UWC CORRESPONDING TO PHYSICAL BLOCK ADDRESS 449 | |
| | ... | ⎬ PAGE 12 |
| 7FDh, 7FCh | HOST ADDRESS CORRESPONDING TO PHYSICAL BLOCK ADDRESS 511 | |
| 7FFh, 7FEh | UWC CORRESPONDING TO PHYSICAL BLOCK ADDRESS 511 | ⎭ |

ADDRESS CONVERSION AND UWC TABLE

FIG. 9

| ADDRESS ON MBI TABLE | CHIP 0 | CHIP 1 | CHIP 2 | ---- | CHIP N-1 | |
|---|---|---|---|---|---|---|
| | | | DATA | | | |
| 001H, 000H | 0 → | 1 → | 2 → | → | N-1 | HOST ADDRESS |
| 003H, 002H | 0 | 0 | 0 | | 0 | UWC |
| 005H, 004H | N ← | N+1 ← | N+2 ← | → | 2N-1 | HOST ADDRESS |
| 007H, 006H | 0 | 0 | 0 | | 0 | UWC |
| 009H, 008H | 2N ← | 2N+1 ← | 2N+2 ← | → | 3N-1 | HOST ADDRESS |
| 00BH, 00AH | 0 | 0 | 0 | | 0 | UWC |
| 00DH, 00CH | 3N ← | 3N+1 ← | 3N+2 ← | → | 4N-1 | HOST ADDRESS |
| 00FH, 00EH | 0 | 0 | 0 | | 0 | UWC |
| 3F9H, 3F8H | 254N ← | 254N+1 ← | 254N+2 ← | → | 255N-1 | HOST ADDRESS |
| 3FBH, 3FAH | 0 | 0 | 0 | | 0 | UWC |
| 3FDH, 3FCH | 77FDH | 77FDH | 77FDH | | 77FDH | HOST ADDRESS |
| 3FFH, 3FEH | 0 | 0 | 0 | | 0 | UWC |
| 401H, 400H | 255N ← | 255N+1 ← | 255N+2 ← | → | 256N-1 | HOST ADDRESS |
| 403H, 402H | 0 | 0 | 0 | | 0 | UWC |
| 7E1H, 7E0H | 503N ← | 503N+1 ← | 503N+2 ← | → | 504N-1 | HOST ADDRESS |
| 7E3H, 7E2H | 0 | 0 | 0 | | 0 | UWC |
| 7E5H, 7E4H | 77FEH | 77FEH | 77FEH | | 77FEH | HOST ADDRESS |
| 7E7H, 7E6H | 0 | 0 | 0 | | 0 | UWC |
| 7E9H, 7E8H | 77FEH | 77FEH | 77FEH | | 77FEH | HOST ADDRESS |
| 7EBH, 7EAH | 0 | 0 | 0 | | 0 | UWC |
| 7F9H, 7F8H | 77FEH | 77FEH | 77FEH | | 77FEH | HOST ADDRESS |
| 7FBH, 7FAH | 0 | 0 | 0 | | 0 | UWC |
| 7FDH, 7FCH | 77FCH | 77FEH | 77FEH | | 77FEH | HOST ADDRESS |
| 7FFH, 7FEH | 0 | 0 | 0 | | 0 | UWC |

| ADDRESS ON MBI TABLE | 1 BYTE | |
|---|---|---|
| 800h | MINIMUM UWC (H) | ORDER TABLE 1 OF 0–255 BLOCKS |
| 801h | MINIMUM UWC (L) | |
| 802h | NUMBER OF MINIMUM LWC BLOCKS | |
| 803h | NUMBER OF MINIMUM LWC+1 BLOCKS | |
| 804h | NUMBER OF MINIMUM LWC+2 BLOCKS | |
| ... | ... | |
| 87Ah | NUMBER OF MINIMUM LWC+120 BLOCKS | |
| 87Bh | –RESERVED– | |
| 87Ch | WRITE COUNT OF MBI TABLE | 0–255 / 256–511 COMMON |
| ... | ... | |
| 87Fh | | |
| 880h | BLOCK NUMBER OF FIRST PRIORITY BLOCK TO BE SWAPPED | |
| 881h | BLOCK NUMBER OF SECOND PRIORITY BLOCK TO BE SWAPPED | |
| ... | ... | |
| 97Fh | BLOCK NUMBER OF 255th PRIORITY BLOCK TO BE SWAPPED | |
| 980h | MINIMUM UWC (H) | ORDER TABLE 2 OF 256–511 BLOCKS |
| 981h | MINIMUM UWC (L) | |
| 982h | NUMBER OF MINIMUM LWC BLOCKS | |
| 983h | NUMBER OF MINIMUM LWC+1 BLOCKS | |
| 984h | NUMBER OF MINIMUM LWC+2 BLOCKS | |
| ... | ... | |
| 9FAh | NUMBER OF MINIMUM LWC+120 BLOCKS | |
| 9FBh | EMPTY | |
| ... | | |
| 9FFh | | |
| A00h | BLOCK NUMBER OF FIRST PRIORITY BLOCK TO BE SWAPPED | SWAP ORDER TABLE |
| A01h | BLOCK NUMBER OF SECOND PRIORITY BLOCK TO BE SWAPPED | |
| ... | ... | |
| AFFh | BLOCK NUMBER OF 255th PRIORITY BLOCK TO BE SWAPPED | |

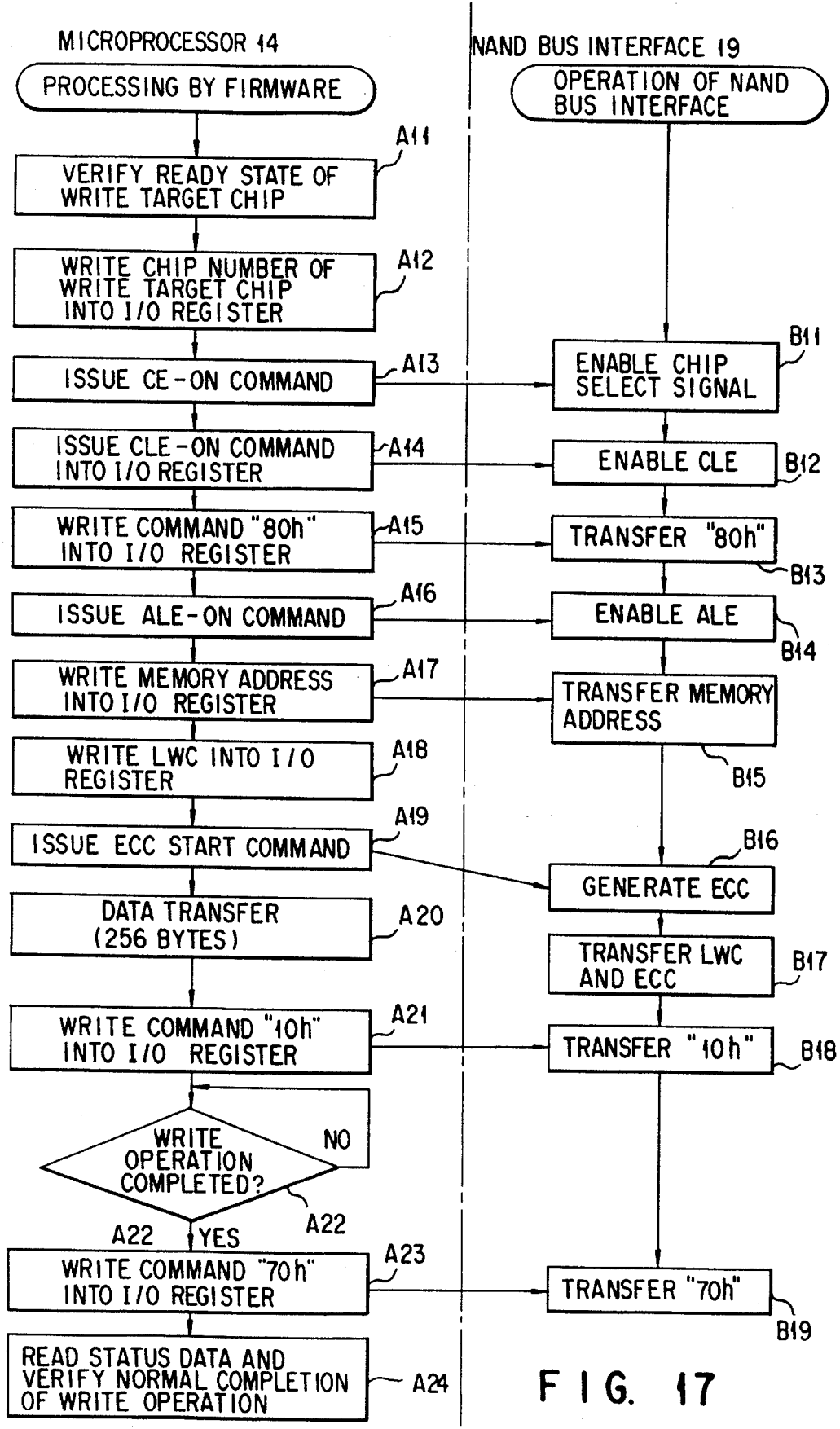
F I G. 17

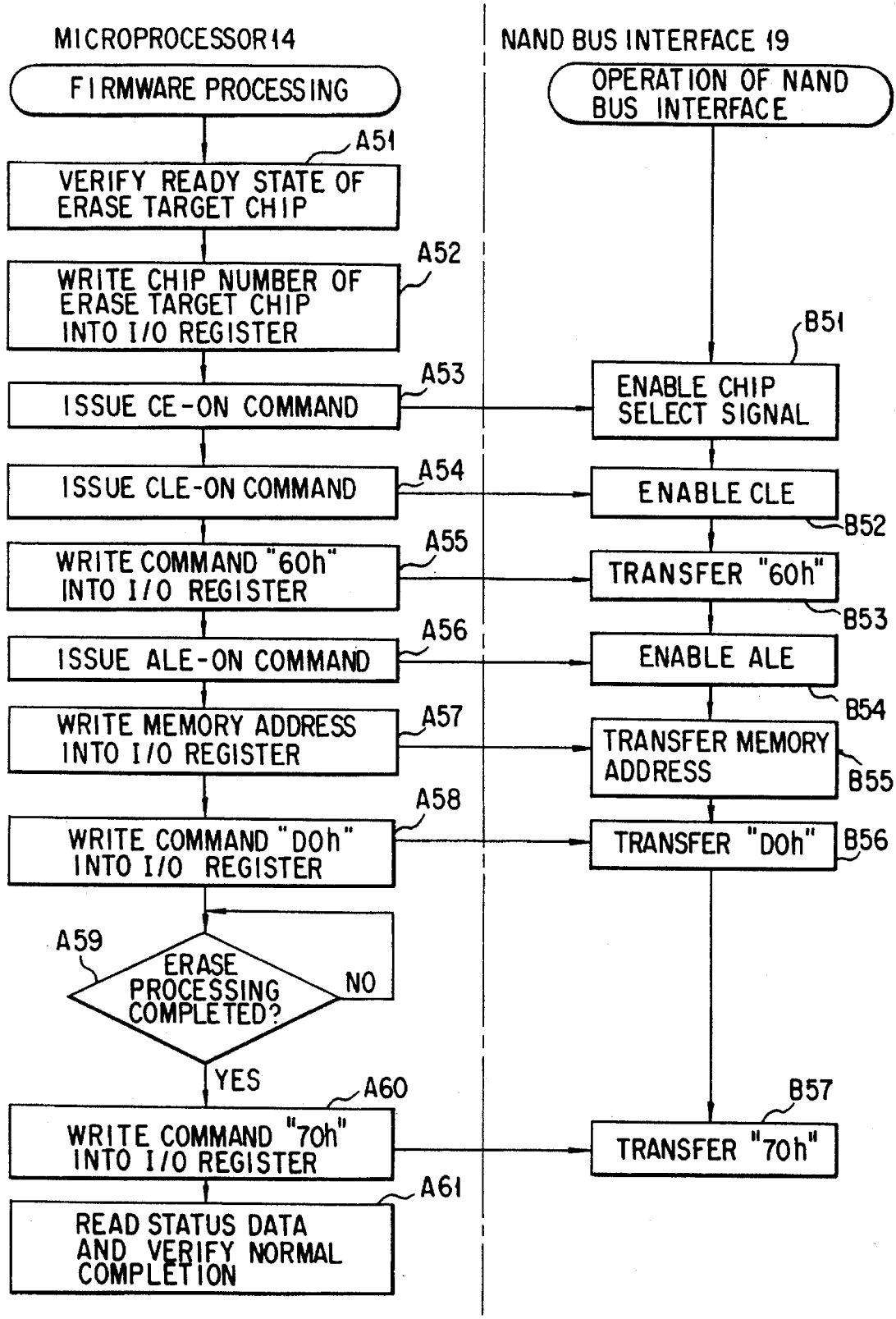
F I G. 21

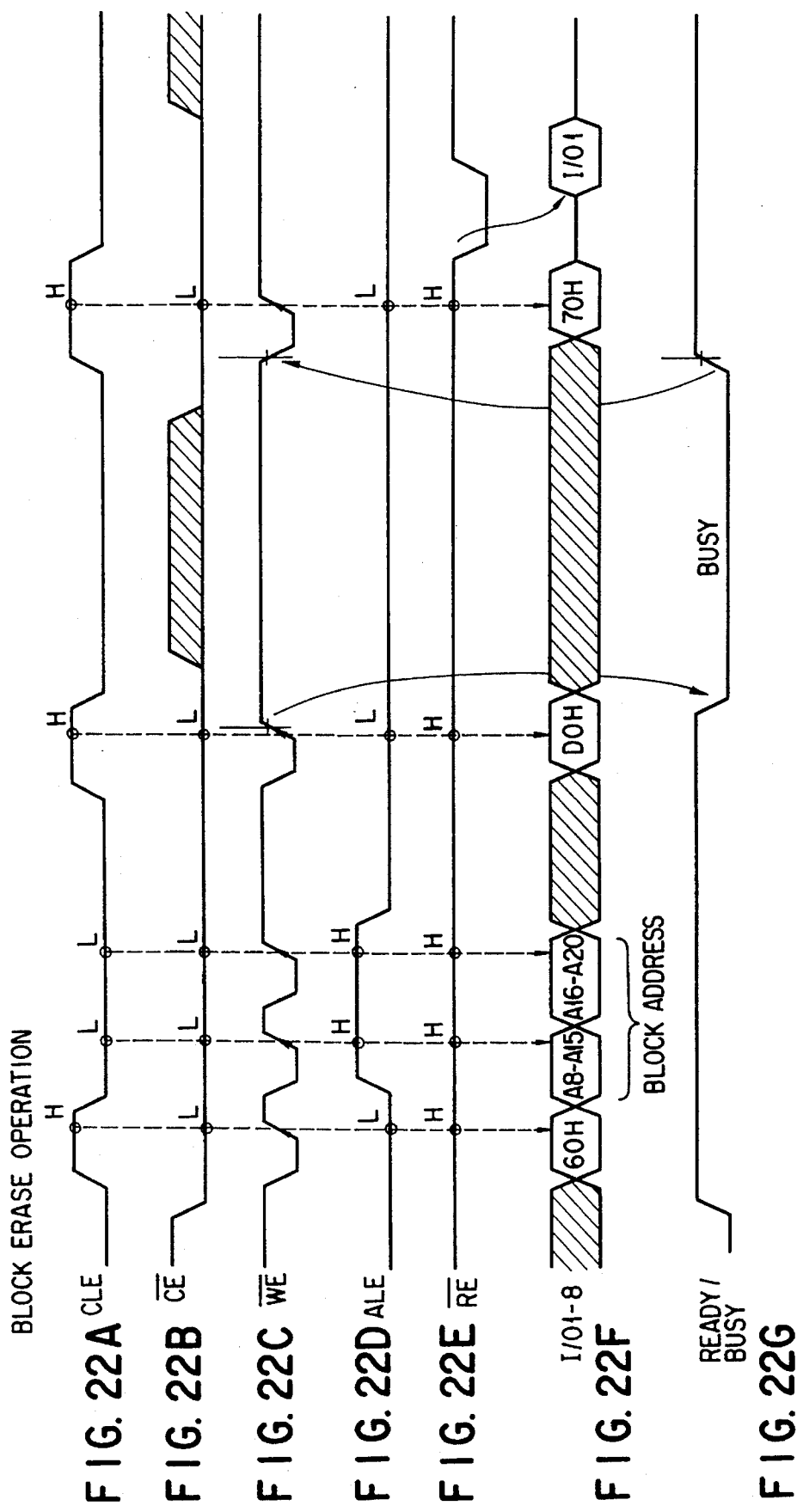

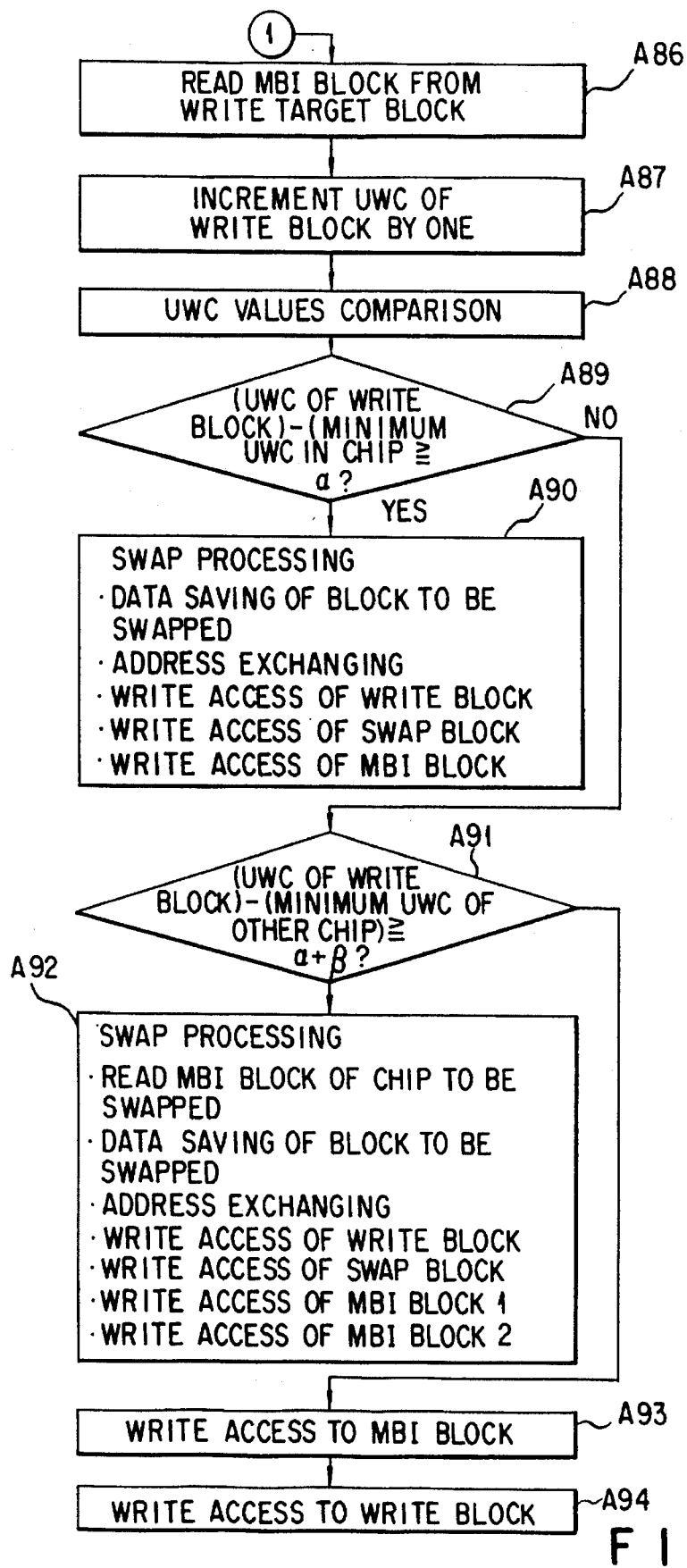
F I G. 23B

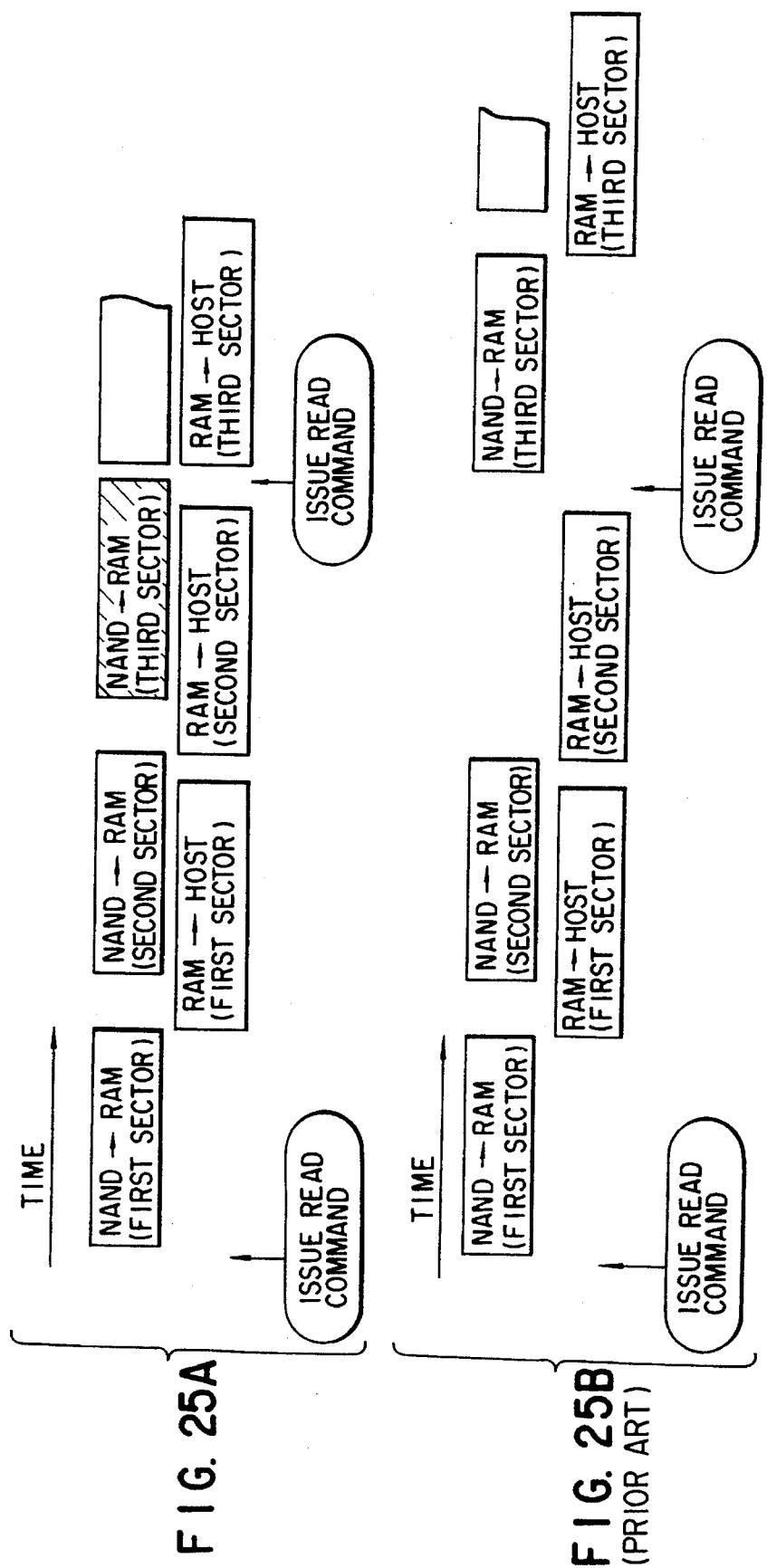
F I G. 25A
F I G. 25B (PRIOR ART)

SEMICONDUCTOR DISK SYSTEM HAVING A PLURALITY OF FLASH MEMORIES

BACKGROUND OF THE INVENTION

1. Field of the Invention

The present invention relates to a semiconductor disk system and, more particularly, to a semiconductor disk system which incorporates a plurality of flash EEPROMs (Electrically Erasable and Programmable Read-Only Memories) having a function of automatically executing a page write operation and accesses these flash EEPROMs in response to a disk access request from a host system.

The present invention also relates to a semiconductor disk system which incorporates a flash EEPROM having a plurality of pages each including a data storage area and a redundancy area and accesses this flash EEPROM in response to a disk access request from a host system.

2. Description of the Related Art

Many conventional information processing apparatuses such as workstations and personal computers use magnetic disk units as secondary storages. Although these magnetic disk units have the advantages of, e.g., a high recording reliability and a low bit cost, they also have the disadvantages that they are large in size and weak against physical shocks.

In recent years, therefore, semiconductor disk systems which are small in size and strong against physical shocks are attracting attention. A semiconductor disk system uses a flash EEPROM, which is a nonvolatile semiconductor memory whose data can be electrically, simultaneously erased, as a secondary storage of a personal computer or the like in the same way as conventional magnetic disk units are used. This semiconductor disk system does not include a mechanical movable portion such as a magnetic head or a rotary disk of a magnetic disk unit. Therefore, the semiconductor disk system hardly causes erroneous operations or failures due to physical shocks. The semiconductor disk system has another advantage of being able to be miniaturized.

Recently, various types of flash EEPROMs of a so-called command control type have been developed, in which all operation modes can be designated by external commands.

A flash EEPROM of this type includes a data register for storing data of one page and can automatically execute a data write operation from the data register to a memory cell array or a data read operation from the memory cell array to the data register without being controlled by an external system. The external system can check whether the data write or read operation of the flash EEPROM is completed in accordance with a ready/busy signal from the flash EEPROM.

When such command control type flash EEPROMs are incorporated into a semiconductor disk system, an internal controller of the semiconductor disk system is released from control of these flash EEPROMs once the controller issues a command to designate the operation mode of the flash EEPROMs. Consequently, while performing a write operation for one flash EEPROM, for example, the controller can control a write access to another flash EEPROM in a standby state.

Unfortunately, conventional semiconductor disk systems make use of a configuration in which an AND output of ready/busy signals from a plurality of flash EEPROMs is input to a controller through one signal line. Therefore, it is not possible to independently detect the operating states (read/busy) of the individual flash EEPROMs.

For this reason, the command control function of the flash EEPROM cannot be effectively utilized. As a consequence, parallel processing such as one in which a write access is performed for one flash EEPROM in a standby state while a write operation is being performed for another flash EEPROM is not currently performed.

As described above, conventional semiconductor disk systems do not employ a configuration corresponding to the command control type flash EEPROM. Therefore, even if command control type flash EEPROMs are used, it is not possible to independently detect the operating states (ready/busy) of the individual flash EEPROMs. This makes it impossible to allow a plurality of flash EEPROMs to simultaneously execute write operations, so the operating performance cannot be improved.

Generally, semiconductor disk systems have an ECC (Error Check Correction) calculating function for checking data when the data is read out or written; that is, an ECC (Error Correction Code) corresponding to the contents of data to be written in a flash EEPROM is generated and added to the data. Use of this ECC calculating function makes it possible to increase the reliability of data to be written in a flash EEPROM.

FIG. 1 shows a typical data storage format used in conventional semiconductor disk systems having the ECC calculating function.

An ECC is conventionally generated for each sector which is a disk access unit of a host system. Therefore, when sector data having a size of 512 bytes is stored across two pages of a flash EEPROM, as in FIG. 1, an ECC is stored in a position subsequent to the sector data. The number of pages of a flash EEPROM across which sector data is stored is determined by the physical size of the flash EEPROM. When a 16-Mbit flash EEPROM which is the largest of currently developed flash EEPROMs is used, 512-byte sector data is stored across two pages of the flash EEPROM as illustrated in FIG. 1. In this case, the sector data across these two pages is calculated, and an ECC is generated accordingly. The ECC thus generated is stored in the second page subsequent to the sector data.

It is unfortunate that conventional semiconductor disk systems using the data storage format as described above bring about inconvenience such as a decrease in the data storage reliability due to the error generation characteristics of a flash EEPROM to be described below.

That is, semiconductor memories such as a flash EEPROM have an error mode in which failures occur simultaneously in a plurality of memory cells connected to the same bit line, rather than in a certain specific memory cell. This error mode is brought about by, e.g., a failure of a bit line or defective contacts between a bit line and cells.

If this error mode occurs, as shown in FIG. 1, abnormal cells are produced at the same bit position of a plurality of pages of a flash EEPROM. In this case, in a conventional semiconductor disk system errors take place at two portions of a data string as an object of the ECC calculation, as in FIG. 1.

Generally, in error detection and correction using an ECC, it is readily possible to detect and correct a single error, but detection and correction for two or more errors are difficult. To successfully handle two or more errors, a complicated ECC arithmetic expression with a high data recovery capability is necessary.

If, however, an ECC arithmetic expression is complicated, the configuration of a semiconductor disk system is also complicated. In addition, since generation of an ECC during the data write and an ECC check calculation during the data read require a longer period of time, the access speed of a semiconductor disk system is lowered.

Also, in conventional semiconductor disk systems not only ECC generation and ECC calculation but error detection and error correction based on the calculation result are performed by hardware. Therefore, the number of gates is increased to realize this hardware, or the hardware itself is complicated. The result is a decrease in the read/write rate.

Furthermore, in conventional semiconductor disk systems, the write counts of individual blocks of a flash EEPROM are collectively managed by write count information stored in a particular block of that flash EEPROM. Writing data into a flash EEPROM, therefore, requires two write accesses, i.e., a write access for the data write operation and a write access for updating the write count information. This prolongs the necessary time for the data write and also exceedingly increases the number of write accesses to the block which stores the write count information compared to those of other blocks. This results in a shortened service life of the flash EEPROM.

As described above, the physical structure of a flash EEPROM is not well considered in conventional semiconductor disk systems. For this reason, no satisfactory storage reliability can be obtained even if the ECC calculating function is provided. Additionally, since the pieces of write count information are concentratedly stored in a specific block, the write count of that block alone is increased. This shortens the service life of a flash EEPROM.

SUMMARY OF THE INVENTION

It is the first object of the present invention to provide a semiconductor disk system capable of independently detecting the operating states (ready/busy) of a plurality of flash EEPROMs and thereby causing these flash EEPROMs to simultaneously execute write operations.

It is the second object of the present invention to provide a semiconductor disk system capable of managing an ECC (Error Correction Code) and write count information by effectively using a redundancy area of each page of a flash EEPROM, thereby realizing a high reliability of the stored data and a long service life of each flash EEPROM.

According to a first aspect of the present invention, there is provided a semiconductor disk system comprising: a plurality of flash memories each for automatically executing data write processing in response to a write command and, during a period of the data write processing, generating a ready/busy signal indicating a busy state; a data buffer for storing write data transferred from a host system; status managing means, having a plurality of input ports for receiving the output ready/busy signals from the flash memories, for managing a status of each of the flash memories in accordance with a corresponding input ready/busy signal, and write access means including status determining means for determining a status of a flash memory designated by a write access request from the host system by using the status managing means, and data transfer means for, if the designated flash memory is in a ready state, issuing a write command to the designated flash memory and transferring the write data stored in the data buffer.

According to a second aspect of the present invention, there is provided an access control method in a semiconductor disk system which comprises a plurality of flash memories each for automatically executing data write processing in response to a write command and, during a period of the data write processing, generating a ready/busy signal indicating a busy state, and a data buffer for storing write data transferred from a host system, comprising the steps of: a) receiving the output ready/busy signals from the flash memories; b) managing a status of each of the flash memories in accordance with a corresponding ready/busy signal received in the step a); c) determining a status of a flash memory designated by a write access request from the host system in accordance with the step b); and d) if the designated flash memory is in a ready state, issuing a write command to the designated flash memory and transferring the write data stored in the data buffer.

In the system or the method according to the first or second aspect, a plurality of ready/busy signals are independently received. This allows an independent management of the operating states of individual flash memories. Consequently, a write access can be started if only a flash memory as a write access target is set in a ready state, without waiting until the operations of all flash memories are completed. In addition, the flash memories used in this semiconductor disk system are of a command control type which can automatically execute a write operation. Therefore, control for executing a write operation is released from this write control processing once a write command is issued to a flash memory as a write access target. This makes it possible to perform a write access to a given flash memory while a data write operation is being executed for another flash memory. Consequently, a plurality of flash memories can be operated parallel, and this improves the data write rate.

Also, it is preferable that, for a plurality of flash memory chips, consecutive sector numbers be allocated across these chips. Consequently, when a host system issues a request for writing write data across successive sectors, it is possible to make a plurality of flash memories write this write data. This results in a more efficient write operation.

According to a third aspect of the present invention, there is provided a semiconductor disk system comprising: a plurality of flash memories each having a memory cell array constituted by a plurality of blocks each consisting of a plurality of pages, each of the flash memories automatically executing page write processing for writing data of one page into the memory cell array in response to a write command and generating a ready/busy signal indicating a busy state during the page write processing; a memory for storing write data transferred from a host system; setting means for setting, on the basis of the write data, block data to be written into individual designated blocks of the flash memories designated by a write access request from the host system; data transfer means for transferring one page of the block data set by the setting means to the flash memories designated by the write access request and issuing a write command; detecting means for detecting completion of the page write access of each of the flash memories to which the data is transferred by the data transfer means, in accordance with the ready/busy signals generated from the flash memories; and control means for controlling the data transfer means in accordance with the page write access completion detected by the detecting means, such that the set block data is entirely transferred.

According to a fourth aspect of the present invention, there is provided an access control method in a semiconductor disk system which comprises a plurality of flash memories each having a memory cell array constituted by a plurality of blocks each consisting of a plurality of pages, each of the flash memories automatically executing page write processing for writing data of one page into the memory cell array in response to a write command and generating a ready/busy signal indicating a busy state during the page write processing, and a memory for storing write data transferred from a host system, comprising the steps of: a) setting, on the basis of the write data, block data to be written into individual designated blocks of the flash memories designated by a write access request from the host system; b) transferring one page of the block data set in the step a) to the flash memories designated by the write access request and issuing a write command; c) detecting completion of the page write access of each of the flash memories to which the data is transferred in the step b), in accordance with the ready/busy signals generated from the flash memories; and d) controlling the step b) in accordance with the page write access completion detected in the step c), such that the set block data is entirely transferred.

In the system or the method according to the third or fourth aspect, a plurality of block data are generated in a one-to-one correspondence with a plurality of flash memories as write access targets. These chips (memories) are sequentially subjected to the succeeding page write operation from the one whose preceding page write operation is completed. For this reason, it is possible to bring out the maximum write performance of each built-in flash memory chip of the semiconductor disk system even if a difference is produced in the necessary page write time between these chips due to the difference in the performance between them or the difference in the number of page write operations retried by page write verify.

According to a fifth aspect of the present invention, there is provided a semiconductor disk system comprising: a flash memory having a memory cell array consisting of a plurality of pages each including a data storage area and a redundancy area, and a data register for holding data of one page, data transfer between the data register and the memory cell array being executed in units of pages; a data buffer for storing write data transferred from a host system and read data read out from the flash memory; error correction code generating means for performing, in response to a write request from the host system, a calculation for the write data stored in the data buffer in units of data strings each corresponding to a size of the data storage area of each page, thereby generating an error correction code for each data string; and write access means for adding a corresponding error correction code to each data string, in order that each data string and an error correction code corresponding to the data string are written into the data storage area and the redundancy area, respectively, of the same page, and transferring the data string and the error correction code to the data register, thereby performing a write access to the flash memory.

According to a sixth aspect of the present invention, there is provided a data hold control method in a semiconductor disk system which comprises a flash memory having a memory cell array consisting of a plurality of pages each including a data storage area and a redundancy area, and a data register for holding data of one page, data transfer between the data register and the memory cell array being executed in units of pages, and a data buffer for storing write data transferred from a host system and read data read out from the flash memory, comprising the steps of: a) in response to a write request from the host system, performing a calculation for the write data stored in the data buffer in units of data strings each corresponding to a size of the data storage area of each page, thereby generating an error correction code for each data string; and b) adding a corresponding error correction code to each data string, in order that each data string and an error correction code corresponding to the data string are written into the data storage area and the redundancy area, respectively, of the same page, and transferring the data string and the error correction code to the data register, thereby performing a write access to the flash memory.

In the system or the method according to the fifth or sixth aspect, error correction codes are generated in a one-to-one correspondence with pages of a flash EEPROM, and each code is written in a redundancy area of each page. For this reason, even if abnormal cells take place at the same bit position in a plurality of pages of the flash EEPROM, only one abnormal cell is contained in a data string as an object of the error correction code calculation. Therefore, error detection and correction can be performed by a conventional simple ECC calculation without using any complicated ECC arithmetic expression with a high data recovery capability. The result is a semiconductor disk system having a high storage reliability and capable of being accessed at a high speed.

In addition, in this semiconductor disk system, not only the error correction code but bad sector information and error information, that are designated by the host system, also are written in the redundancy area. This eliminates the need for a centralized management for the bad sector information and the error information, making a dedicated area for storing these pieces of information unnecessary. Consequently, the data storage area of the flash memory can be effectively used to store user data.

Also, in addition to the above system, a ROM which stores programs to be executed by the host system is provided, so that the programs are transferred from the ROM to the host system in response to a read request for predetermined addresses from the host system.

This semiconductor disk system includes, in addition to the flash memory, a ROM which stores programs such as application programs and an operating system. The programs stored in the ROM are read out when the host system issues a read request for predetermined addresses. No rewrite operation takes place in programs such as application programs, so programs of this sort are stored in a relatively inexpensive ROM. Consequently, the data storage area of an expensive flash memory can be effectively used in storage of user data.

According to a seventh aspect of the present invention, there is provided a semiconductor disk system comprising: a flash memory having a memory cell array consisting of a plurality of pages each including a data storage area and a redundancy area, and a data register for holding data of one page, data transfer between the data register and the memory cell array being executed in units of pages; a microprocessor; a data buffer for storing write data transferred from a host system and read data read out from the flash memory; a flash memory interface circuit, controlled by the microprocessor, for performing a read/write access to the flash memory; and an I/O registers set capable of being read/written by the microprocessor, wherein the flash memory interface circuit includes an error correction code generation circuit for performing a calculation for write data which is read out by the microprocessor from the data buffer in units of data strings each corresponding to a size of the data storage area of each page, thereby generating an error correction code for each data string, a write data transfer circuit for adding a corresponding error correction code to each data string, in order that each data string and an error correction code corresponding to the data string are written into the data storage area and the redundancy area, respectively, of the same page, and transferring the data string and the error correction code to the data register of the flash memory, a read data transfer circuit for extracting the data string stored in the data storage area from the read data read out from the data register of the flash memory, and transferring the extracted data string to the data buffer, and an error correction code check circuit for executing error detection for the read data by using the error correction code contained in the read data, and setting the detection result in the I/O register, and the microprocessor is so programmed as to execute error correction for the read data transferred to the data buffer in accordance with the calculation result set in the I/O register.

In this system, an error correction code is generated and a check for error detection is performed by the hardware logic of the flash memory interface circuit. Also, error correction for read data is done by the firmware which is executed by the microprocessor. Therefore, the load is efficiently distributed to the firmware and the hardware. Consequently, the configuration of the hardware can be simplified compared to that in the case in which all of ECC generation, an ECC check calculation for error detection, and error correction are implemented by hardware.

According to an eighth aspect of the present invention, there is provided a semiconductor disk system comprising: a flash memory having a memory cell array which includes a plurality of blocks each consisting of a plurality of pages each including a data storage area and a redundancy area, and in which write count information indicative of a write count of each block is stored in the redundancy area of a predetermined page of each block, and a data register for holding data of one page, data transfer between the data register and the memory cell array being executed in units of pages, and an erase operation being executed in units of blocks; a data buffer for storing write data transferred from a host system and read data read out from the flash memory; updating means for reading out the write count information from the predetermined page of a write target block which is designated by a write request from the host system, and updating a value of the write count information; and write access means for generating page data by adding the updated write count information to write data to be written into the predetermined page, and transferring the page data to the data register of the flash memory such that the write data and the updated write count information are stored in the data storage area and the redundancy area, respectively, of the predetermined page, thereby performing a write access to the flash memory.

According to a ninth aspect of the present invention, there is provided an access control method in a semiconductor disk system which comprises a flash memory having a memory cell array which includes a plurality of blocks each consisting of a plurality of pages each including a data storage area and a redundancy area, and in which write count information indicative of a write count of each block is stored in the redundancy area of a predetermined page of the block, and a data register for holding data of one page, data transfer between the data register and the memory cell array being executed in units of pages, and an erase operation being executed in units of blocks, and a data buffer for storing write data transferred from a host system and read data read out from the flash memory, comprising the steps of: a) reading out the write count information from the predetermined page of a write target block which is designated by a write request from the host system, and updating a value of the write count information; b) generating page data by adding the updated write count information to write data to be written into the predetermined page; and c) transferring the page data to the data register of the flash memory such that the write data and the updated write count information are stored in the data storage area and the redundancy area, respectively, of the predetermined page, thereby performing a write access to the flash memory.

In the system or the method according to the eighth or ninth aspect, the redundancy area of a predetermined page of each block stores write count information corresponding to that block. In performing a data write access to a write target block, the value of the write count information of the write target block is updated. The updated write count information is added to write data to be written into a predetermined page and transferred to the data register of the flash memory. Since the write count information is managed in each block in this manner, it is not necessary to concentratedly manage the write count information in a specific area. This makes it possible to prevent the problem that the write count in a particular area is extraordinarily increased due to a write access to update the write count information. It is also possible to perform a data write access and update the write count information at the same time only with a write access to the same block. This results in an improved write access performance.

According to a tenth aspect of the present invention, there is provided a semiconductor disk system comprising: a flash memory having a memory cell array which includes a plurality of blocks each consisting of a plurality of pages each including a data storage area and a redundancy area, and in which first write count data constituted by an upper bit portion of write count data indicative of a write count of each block is stored in a predetermined block, and second write count data constituted by a lower bit portion of write count data corresponding to each block is stored in the redundancy area of a predetermined page of the block, and a data register for holding data of one page, the flash memory being set, in response to a command, in one of an erase operation mode by which stored contents are erased in units of blocks, a write operation mode by which data is written in the memory cell array in units of pages, and a read operation mode by which data is read out from the memory cell array in units of pages; a data buffer for storing write data transferred from a host system and read data read out from the flash memory; write count managing means for setting the flash memory in the read operation mode by issuing a read command, reading out the first write count data from the predetermined block, and managing the write count of each block of the flash memory in accordance with the readout first write count data; updating means for setting the flash memory in the read operation mode by issuing a read command, reading out the second write count data from the predetermined page of a write target block designated by a write request, and updating a value of the readout second write count data; header table generating means for reading out data stored in a page other than a write access target page of the write target block into the data buffer, and, on the basis of an address of the readout data in the data buffer and an address of the write data stored in the data buffer, generating a header table which holds address information indicating a storage position, in the data buffer, of each data constituting block data of one block to be written into the write target block; erasing means for setting the flash memory in the erase operation mode by issuing an erase command, and erasing stored contents of the write target block; and write access means for reading out the block data in units of pages from the data buffer by referring to the address information of the header table, and transferring the readout data to the data register, thereby performing a write access to the flash memory, wherein the write count managing means includes updating means for updating a value of the first write count data corresponding to the write target block, if a carry occurs from the second write count data to the first write count data upon updating the second write count data.

According to an eleventh aspect of the present invention, there is provided an access control method in a semiconductor disk system which comprises a flash memory having a memory cell array which includes a plurality of blocks each consisting of a plurality of pages each including a data storage area and a redundancy area, and in which first write count data constituted by an upper bit portion of write count data indicative of a write count of each block is stored in a predetermined block, and second write count data constituted by a lower bit portion of write count data corresponding to each block is stored in the redundancy area of a predetermined page of the block, and a data register for holding data of one page, the flash memory being set, in response to a command, in one of an erase operation mode by which stored contents are erased in units of blocks, a write operation mode by which data is written in the memory cell array in units of pages, and a read operation mode by which data is read out from the memory cell array in units of pages, and a data buffer for storing write data transferred from a host system and read data read out from the flash memory, comprising the steps of: a) setting the flash memory in the read operation mode by issuing a read command, reading out the first write count data from the predetermined block, and managing the write count of each block of the flash memory in accordance with the readout first write count data; b) setting the flash memory in the read operation mode by issuing a read command, reading out the second write count data from the predetermined page of a write target block designated by a write request, and updating a value of the readout second write count data; c) reading out data stored in a page other than a write access target page of the write target block into the data buffer, and, on the basis of an address of the readout data in the data buffer and an address of the write data stored in the data buffer, generating a header table which holds address information indicating a storage position, in the data buffer, of each data constituting block data of one block to be written into the write target block; d) setting the flash memory in the erase operation mode by issuing an erase command, and erasing stored contents of the write target block; and e) reading out the block data in units of pages from the data buffer by referring to the address information of the header table, and transferring the readout data to the data register, thereby performing a write access to the flash memory, wherein the step a) includes the step of updating a value of the first write count data corresponding to the write target block, if a carry occurs from the second write count data to the first write count data upon updating the second write count data.

In the system or the method according to the 10th or 11th aspect, only the lower bit data of the write count information is stored in the redundancy area, so the use area of the redundancy area can be reduced. Additionally, although the lower bit data needs to be updated each time a rewrite operation occurs, this updating is executed simultaneously with a write access for writing data to a write target block. It is therefore unnecessary to independently perform a write access for a data write operation and a write access for updating the write count information. Also, data in the upper bit portion of the write count information is stored concentratedly in a predetermined block. Consequently, the write counts of all blocks can be managed only by reading out the data from a single block without reading out the write count information in sequence from all the blocks.

A swapping function for averaging the write counts is additionally provided in the write count management. In this semiconductor disk system, whether block swapping is to be performed for averaging is checked when a carry occurs in the data of the lower bit portion of the write count information. If a block whose write count differs by a predetermined value or more from the write count of a write target block is present, it is determined that this block is to be used as a swapping destination block, and the addresses and the stored contents of the block and the write target block are swapped. In this manner, whether block swapping for averaging the write counts is to be performed is checked when a carry takes place in the data of the lower bit portion of the write count information. Consequently, it is no longer necessary to constantly monitor the write count of each block, and this prevents centralized management of the write counts.

A discrete value is stored in each block as the initial value of the second write count data in the manufacture or the shipment of a disk. Consequently, the timing at which a carry occurs differs from one block to another. This makes it possible to prevent concentrated occurrence of swapping determination processing and swap processing resulting from a carry, even if rewrite access to a plurality of blocks successively take place.

In addition to the first write count data, a swapping table is stored in a predetermined block of the flash memory. This swapping table holds priority order information which indicates the priority of a swapping destination block in accordance with the value of the first write count data. Therefore, it is readily possible to specify the swapping destination block without sorting the first write count data.

According to a twelfth aspect of the present invention, there is provided a semiconductor disk system comprising: a flash memory having a memory cell array which includes a plurality of blocks each consisting of a plurality of pages each including a data storage area and a redundancy area, and in which write count information indicating a write count of each block is stored in the redundancy area of a predetermined page of the block, and a data register for holding data of one page, the flash memory being set, in response to an external command, in one of an erase operation mode by which stored contents are erased in units of blocks, a write operation mode by which data is written in units of pages in the memory cell array, and a read operation mode by which data is read out in units of pages from the memory cell array; a data buffer for holding write data transferred from a host system and read data read out from the flash memory; updating means for setting the flash memory in the read operation mode by issuing a read command, reading out the write count information from the predetermined page of a write target block designated by a write request, and updating a value of the readout write count information; header table generating means for, if a page other than a write access target page exists in the write target block, reading out data stored in the page other than the write access target page into the data buffer, and, on the basis of an address of the readout data in the data buffer and an address of the write data stored in the data buffer, generating a header table which holds address information indicating a storage position, in the data buffer, of each data constituting block data of one block to be written into the write target block; erasing means for setting the flash memory in the erase operation mode by issuing an erase command, and erasing stored contents of the write target block; first access means for reading out write data to be written into the predetermined page from the data buffer by referring to the address information in the header table, generating page data by adding the updated write count information to the readout write data, and transferring the page data to the data register such that the write data and the updated write count information are stored in the data storage area and the redundancy area, respectively, of the predetermined page, thereby performing a write access to the flash memory; and second access means for sequentially reading out write data to be written into pages other than the predetermined page from the data buffer by referring to the address information in the header table, and transferring the readout write data to the data register, thereby performing a write access to the flash memory.

According to a thirteenth aspect of the present invention, there is provided an access control method in a semiconductor disk system which comprises a flash memory having a memory cell array which includes a plurality of blocks each consisting of a plurality of pages each including a data storage area and a redundancy area, and in which write count information indicating a write count of each block is stored in the redundancy area of a predetermined page of the block, and a data register for holding data of one page, the flash memory being set, in response to an external command, in one of an erase operation mode by which stored contents are erased in units of blocks, a write operation mode by which data is written in units of pages in the memory cell array, and a read operation mode by which data is read out in units of pages from the memory cell array, and a data buffer for holding write data transferred from a host system and read data read out from the flash memory, comprising the steps of: a) setting the flash memory in the read operation mode by issuing a read command, reading out the write count information from the predetermined page of a write target block designated by a write request, and updating a value of the readout write count information; b) if a page other than a write access target page exists in the write target block, reading out data stored in the page other than the write access target page into the data buffer, and, on the basis of an address of the readout data in the data buffer and an address of the write data stored in the data buffer, generating a header table which holds address information indicating a storage position, in the data buffer, of each data constituting block data of one block to be written into the write target block; c) setting the flash memory in the erase operation mode by issuing an erase command, and erasing stored contents of the write target block; d) reading out write data to be written into the predetermined page from the data buffer by referring to the address information in the header table, generating page data by adding the updated write count information to the readout write data, and transferring the page data to the data register such that the write data and the updated write count information are stored in the data storage area and the redundancy area, respectively, of the predetermined page, thereby performing a write access to the flash memory; and e) sequentially reading out write data to be written into pages other than the predetermined page from the data buffer by referring to the address information in the header table, and transferring the readout write data to the data register, thereby performing a write access to the flash memory.

In the system or the method according to the 12th or 13th aspect, if a page other than a write access target exists in a write target block, so-called unchanged erase data stored in the page other than the write access target is read out, and a header table is generated on the basis of the address of this unchanged erase data and the address of write data from the host. When the header table is generated, the stored contents of the write target block are erased. Thereafter, in accordance with the address information of the header table the block data is transferred in units of pages from the data buffer to the data register, and a write operation is executed in the flash memory. During this data transfer, data to be written into a predetermined page is transferred after being added with write count information. This makes it possible to simultaneously perform the data write operation and the updating of the write count information only by performing a write access to the same block. As a result, the write access performance can be improved. Also, the header table which holds the address information indicative of the storage position of block data of one block is generated. Therefore, by referring to this header table, data transfer processing from the data buffer to the flash memory can be performed without distinguishing between the unchanged erase data and the write data.

In addition to the above system, error correction code generating and calculating functions are provided. The redundancy area of a predetermined page of each block stores write count information and an error correction code, and the redundancy area of each of other pages stores an error correction code. In this semiconductor disk system, it is possible to more effectively utilize the redundancy area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 2 is a block diagram showing the configuration of a semiconductor disk system according to an embodiment of the present invention;

FIG. 3 is a view showing the structure of a NAND type flash EEPROM used in the semiconductor disk system in FIG. 2;

FIG. 7 is a view showing the data storage format of a memory block which is one of the blocks illustrated in FIGS. 6A and 6B and used in storage of user data;

FIG. 9 is a view showing the contents of an address conversion and UWC table which is stored in the MBI table block shown in FIG. 8;

FIG. 11 is a view showing a practical example of address conversion information held in the address conversion table in FIG. 9;

FIG. 12 is a view showing the contents of a swap order table which is stored in the MBI table block in FIG. 8;

FIGS. 16A and 16B are block diagrams for explaining the operations of an ECC calculating circuit provided in the semiconductor disk system in FIG. 2, in which FIG. 16A is a block diagram for explaining a write operation and FIG. 16B is a block diagram for explaining a read operation;

FIG. 17 is a flow chart for explaining the relationship between the processing of firmware and the operation of hardware when data is written into a flash EEPROM of the semiconductor disk system in FIG. 2;

FIGS. 18A to 18G are timing charts for explaining the program cycle of the flash EEPROMs provided in the semiconductor disk system in FIG. 2, in which FIGS. 18A, 18B, 18C, 18D, 18E, 18F, and 18G show a command latch enable signal, a chip enable signal, a write enable signal, an address latch enable signal, a read enable signal, addresses and data, and a ready/busy signal, respectively;

FIGS. 20A to 20G are timing charts for explaining the sequential read cycle of the flash EEPROMs provided in the semiconductor disk system in FIG. 2, in which FIGS. 20A, 20B, 20C, 20D, 20E, 20F, and 20G show a command latch enable signal, a chip enable signal, a write enable signal, an address latch enable signal, a read enable signal, addresses and data, and a ready/busy signal, respectively;

FIG. 21 is a flow chart for explaining the relationship between the processing of firmware and the operation of hardware when data stored in a flash EEPROM is erased in the semiconductor disk system in FIG. 2;

FIGS. 22A to 22G are timing charts for explaining the block erase cycle of the flash EEPROMs provided in the semiconductor disk system in FIG. 2, in which FIGS. 22A, 22B, 22C, 22D, 22E, 22F, and 22G show a command latch enable signal, a chip enable signal, a write enable signal, an address latch enable signal, a read enable signal, addresses and data, and a ready/busy signal, respectively;

FIGS. 23A and 23B are flow charts for explaining the processing of firmware executed from the reception of a write request from a host system for the write access to a flash EEPROM in the semiconductor disk system in FIG. 2;

FIGS. 25A and 25B are views for explaining a function of pre-reading data of one sector in this embodiment, in which FIG. 25A shows a sequential read operation in the semiconductor disk system according to the present invention, and FIG. 25B shows a sequential read operation in a conventional semiconductor disk system.

DETAILED DESCRIPTION OF THE PREFERRED EMBODIMENT

Figure 1:
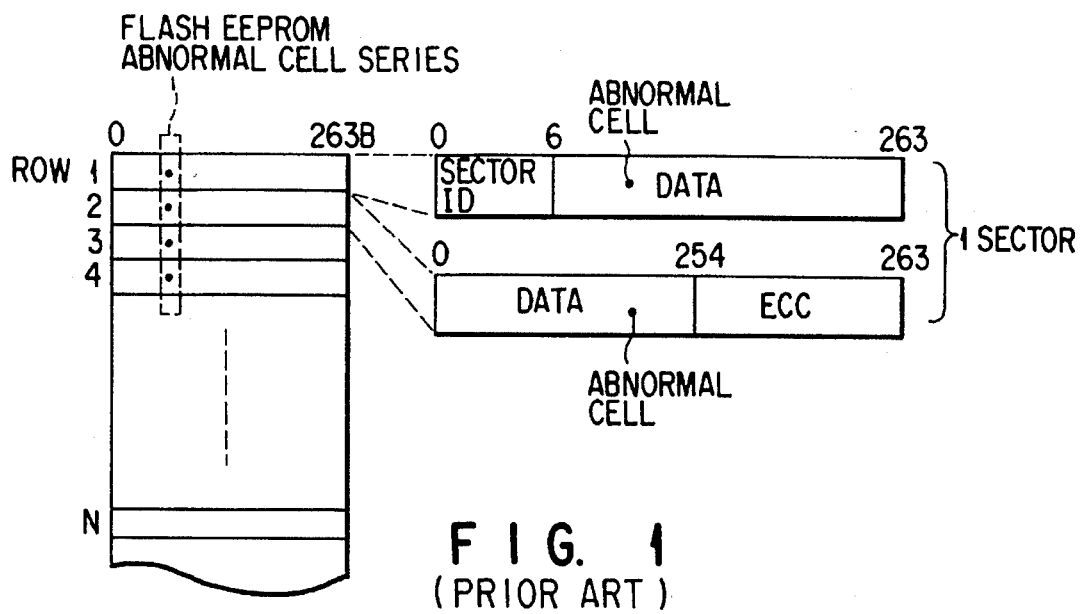
FIG. 1 is a view for explaining a data storage format for a flash EEPROM in a conventional semiconductor disk system.

An embodiment of the present invention will be described below with reference to the accompanying drawings.

FIG. 2 illustrates the configuration of a semiconductor disk system according to the embodiment of the present invention. This semiconductor disk system 10 is connected as a substitute for a hard disk unit to a host system such as a personal computer. The semiconductor disk system 10 emulates a disk access request from the host system (e.g., a file system or a driver for a magnetic disk unit) into an access request for a flash EEPROM and thereby accesses a built-in flash EEPROM of the semiconductor disk system 10. The semiconductor disk system 10 can incorporate a maximum of 16 flash EEPROM chips. These flash EEPROMs are detachably mounted on a circuit board of the semiconductor disk system 10 via respective IC sockets. Referring to FIG. 2, 16 NAND type flash EEPROMs 11-1 to 11-16 are mounted. The semiconductor disk system 10 further incorporates a controller 12 and a RAM (Random Access Memory) 13.

Each of the flash EEPROMs 11-1 to 11-16 is used as a recording medium of this semiconductor disk system 10 and equivalent to a magnetic recording medium of a hard disk unit. These flash EEPROMs 11-1 to 11-16 are connected to the controller 12 through a NAND memory bus 14. The NAND memory bus 14 includes an 8-bit wide data bus and various control signal lines connected to the control signal terminals of the individual flash EEPROMs. These I/O data bus and control signal lines are connected together to data input/output terminals I/O and control signal input terminals CONT (including command latch enable terminals CLE, address latch enable terminals ALE, write enable terminals WE, and read enable terminals RE) of the flash EEPROMs 11-1 to 11-16.

In addition, chip select signal lines (CS1 to CS16) and ready/busy signal lines (R/B1 to R/B16) are arranged between the corresponding chips, i.e., the flash EEPROMs 11-1 to 11-16 and the controller 12.

These flash EEPROMs 11-1 to 11-16 are 16-Mbit NAND type EEPROMs each of which includes a memory cell array 111 and a data register 112, as shown in FIG. 3. The memory cell array 111 has a bit arrangement of 8K rows×264 columns×8 bits and has 512 blocks. Data erasure can be executed in units of these blocks. Each block consists of 16 pages (rows), and each page has a 256-byte data storage area and an 8-byte redundancy area. Data write and read operations are implemented in units of pages via the (256+8)-byte data register 112. In this semiconductor disk system, the redundancy area of each page is used to store an ECC and write count data.

The flash EEPROMs 11-1 to 11-16 have several operation modes such as a write mode, a read mode, and an erase mode, and these operation modes are designated by commands from the controller 12.

In the read mode, data transfer (page read) in units of pages from the memory cell array 111 to the data register 112 is automatically executed in the flash EEPROM. During this data transfer period, the ready/busy signal line is set in a busy state, and thereby the controller 12 is informed that the page read operation is currently being done. One-page data transferred from the data register 112 is read out serially in units of 8 bits from the I/O terminals I/O0 to I/O7. When the serial read operation of the one-page data is completed, a page read operation for the next page is automatically executed.

In the write mode, data transfer (page write) in units of pages from the data register 112 to the memory cell array 111 is automatically executed in the flash EEPROM. During this data transfer period, the ready/busy signal line is set in the busy state, and thereby the controller 12 is informed that the page write operation is currently being done.

In the erase mode, the stored contents of an arbitrary block designated by a command from the controller are erased at once.

In the semiconductor disk system 10, most processing operations for controlling these flash EEPROMs 11-1 to 11-16 are controlled by firmware. Processing operations executed by hardware are ECC generation when data is written into the flash EEPROM and ECC check when data is read out from the flash EEPROM.

The configuration of the disk controller 12 of the semiconductor disk system 10 will be described below.

The disk controller 12 is realized by a single LSI. On this LSI chip, as illustrated in FIG. 2, a microprocessor (MPU) 15, a processor bus interface 15a, a ROM 16, an external bus interface 17, a buffer memory controller 18, and a NAND bus interface 19 are integrated.

The microprocessor 15 executes firmware stored in the ROM 16 to control the operation of the entire semiconductor disk system 10. The microprocessor 15 controls address conversion processing for converting a host address for a disk access supplied from a CPU 1 of the personal computer into a memory address for accessing the flash EEPROMs 11-1 to 11-16 and access control processing for performing a read/write access to the flash EEPROMs 11-1 to 11-16. The microprocessor 15 also manages the data write counts of the flash EEPROMs 11-1 to 11-16 and controls swap processing for averaging the data write counts.

The ROM 16 stores the firmware to be executed by the microprocessor 15 and various programs such as an operating system and application programs to be executed by the CPU 1 of the personal computer. The operating system and the application programs are managed in the form of files in the ROM 16. These programs are read out from the ROM 16 in response to a read request which is issued from the CPU 1 to the semiconductor disk system 10, and loaded in a main memory 3 of the personal computer.

Consecutive disk addresses are mapped in the ROM 16 and the flash EEPROMs 11-1 to 11-16, so the ROM 16 is also used as a partial recording medium of the disk system 10. For this reason, the operating system or the application program stored in the ROM 16 is read out only when the read request from the CPU 1 designates a certain specific address. If the read request designates some other address, a read access to the flash EEPROMs 11-1 to 11-16 is performed.

The external bus interface 17 is an interface made according to the specification of IDE (Integrated Device Electronics) or PCMCIA (Personal Computer Memory Card International Association) and connected to a system bus 2 of the personal computer. The external bus interface 17 incorporates an I/O registers set for communications with the CPU 1. This registers set includes a sector number register 171, a sector count register 172, a data register 173, a cylinder register 174, a drive/head register 175, a command register 176, a status register 177, and an error register 178. Read and write accesses to these registers can be performed by the microprocessor 15 and the CPU 1 of the personal computer.

A sector number for designating an access start position is written in the sector number register 171 by the CPU 1. The number of sectors of a read/write target is written in the sector count register 172 by the CPU 1. Write data to be supplied from the CPU 1 or read data to be read out from the semiconductor disk system 10 is set in the data register 173. The cylinder number of the read/write target is written by 8 bits for each of low and high in the cylinder register 174 by the CPU 1. The drive number and the head number of the read/write target are written in the drive/head register 175 by the CPU 1. A read command or a write command for designating the operation of the semiconductor disk system 10 is written in the command register 176 by the CPU 1. Various statuses of the semiconductor disk system 10 which are to be informed to the CPU 1 are set in the status register 177. If an error is found by an ECC calculation or the like, information indicating this error is written in the error register 178 by the microprocessor 15.

The buffer memory controller 18 controls access to the RAM 13 and transfers data between the system bus 2 and the RAM 13. Data transfer includes this data transfer between the system bus 2 and the RAM 13 and data transfer between the RAM 13 and the flash EEPROMs 11-1 to 11-16. The latter data transfer is implemented by a move string instruction from the microprocessor 15.

The NAND bus interface 19 is a hardware logic which controls access to the flash EEPROMs 11-1 to 11-16 under the control of the microprocessor 15. The NAND bus interface 19 transfers data to the flash EEPROMs 11-1 to 11-16 and exchanges various control signals with the flash EEPROMs. As illustrated in FIG. 2, in addition to the I/O terminal connected to the NAND memory bus 14, the NAND bus interface 19 has 16 input terminals for independently receiving ready/busy signals (R/B1 to R/B16) from the corresponding chips, i.e., the 16 flash EEPROMs 11-1 to 11-16 and 16 output terminals for independently applying chip select signals (CS1 to CS16) to the 16 flash EEPROMs 11-1 to 11-16.

The NAND bus interface 19 also has an I/O registers set 20 which can be read and written by the microprocessor 15 and an ECC calculating circuit 21. The ECC calculating circuit 21 performs a calculation for generating an ECC and a calculation for ECC check.

Figure 4:
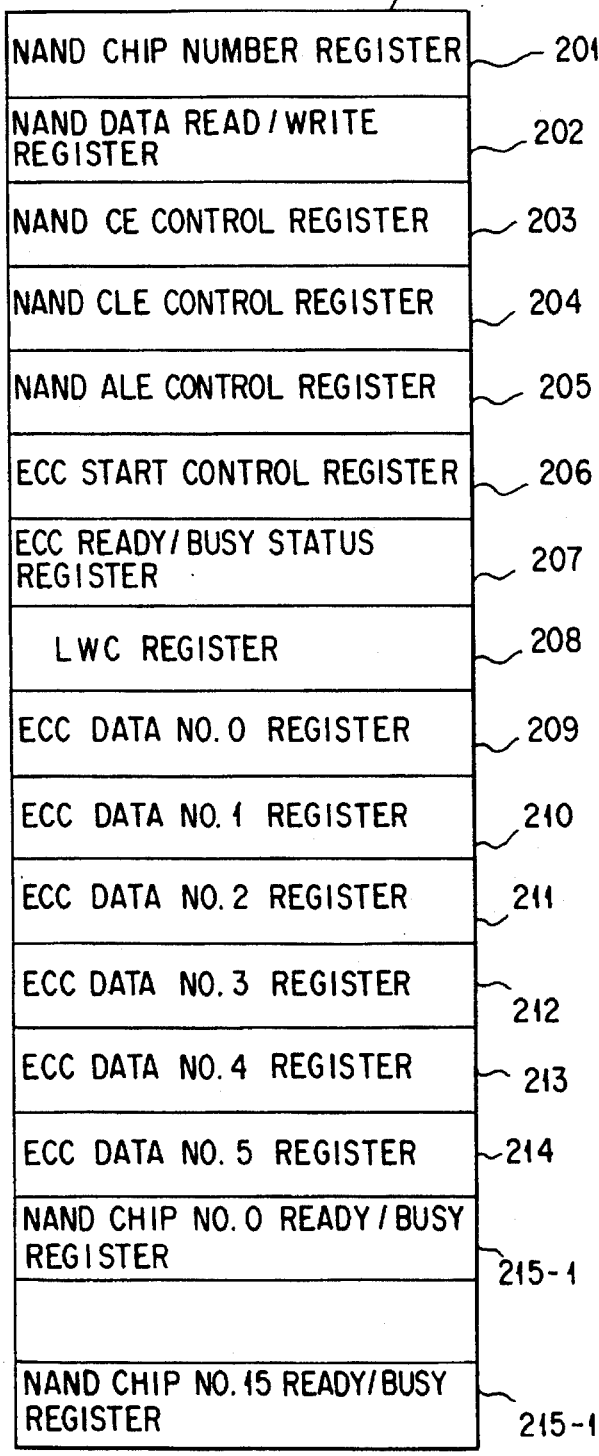
FIG. 4 is a view showing an I/O registers set provided in the semiconductor disk system in FIG. 2.

As illustrated in FIG. 4, the I/O registers set 20 includes a NAND chip number register 201, a NAND data read/write register 202, a NAND chip enable control register 203, a NAND command latch enable control register 204, a NAND address latch enable control register 205, an ECC start control register 206, an ECC ready/busy status register 207, an LWC register 208, six ECC data registers 209 to 214, and 16 NAND chip ready/busy status registers 215-1 to 215-16.

The NAND chip number register 201 selects a NAND type flash EEPROM for which processing is to be executed. A value indicative of the chip number of a NAND type flash EEPROM as an access target is set in the NAND chip number register 201 by the microprocessor 15.

The NAND data read/write register 202 performs read and write accesses of data to a flash EEPROM through the data bus. The NAND data read/write register 202 is used to issue a command and an address to a flash EEPROM and read out status data from a flash EEPROM.

The NAND chip enable control register 203 controls the chip enable terminal CE of each flash EEPROM. A flag indicating the presence/absence of a chip select signal is set in the NAND chip enable control register 203 by the microprocessor 15. When a flag "1" is set in bit 0, the NAND bus interface 19 generates a chip select signal (CS) by which the chip enable terminal CE of a flash EEPROM chosen by the NAND chip number register 201 is activated.

The NAND command latch enable control register 204 controls the command latch enable terminal CLE of each flash EEPROM. A flag for designating whether the command latch enable terminal CLE is to be enabled is set in the NAND command latch enable control register 204 by the microprocessor 15. When a flag "1" is set in bit 0, the command latch enable terminal CLE of the corresponding flash EEPROM is activated by the NAND bus interface 19. Consequently, the flash EEPROM is informed that the command is issued to the data bus. The NAND address latch enable control register 205 controls the address latch enable terminal ALE of each flash EEPROM. A flag for designating whether the address latch enable terminal ALE is to be activated is set in the NAND address latch enable control register 205 by the microprocessor 15. When a flag "1" is set in bit 0, the address latch enable terminal ALE of the corresponding flash EEPROM is activated by the NAND bus interface 19. Consequently, the flash EEPROM is informed that the address is issued to the data bus.

The ECC start control register 206 controls the start of execution of an ECC calculation. Prior to starting data transfer between the RAM 13 and the flash EEPROMs 11-1 to 11-16, a flag for designating the start of execution of an ECC calculation is set by the microprocessor 15. To transfer data from a flash EEPROM to the RAM 13, "1" is set in bit 0. In this case, the ECC calculating circuit 21 performs ECC check for the data read out from that flash EEPROM. To transfer data from the RAM 13 to a flash EEPROM, "0" is set in bit 0. In this case, the ECC calculating circuit 21 generates an ECC for the data to be transferred from the RAM 13.

The ECC ready/busy status register 207 indicates whether the ECC calculating circuit 211 is executing the ECC calculation (ECC generation or ECC check). The NAND bus interface 19 sets a flag "1" in bit 0 if the ECC calculation is being executed and a flag "0" in bit 0 if the ECC calculation is completed. When transfer of 256-byte data between the RAM 13 and the flash EEPROMs 11-1 to 11-16 is completed, the microprocessor 15 checks by referring to the flag of the register 207 whether the ECC calculation is completed. If the microprocessor 15 determines that the operation is completed, the microprocessor 15 starts transfer of the next 256-byte data.

Data to be stored in the first two bytes of the 8-byte redundancy area of each flash EEPROM, e.g., LWC (Low Write Count) data as the lower bits of write count data is set in the LWC register 208. That is, in data transfer from the RAM 13 to a flash EEPROM, LWC data corresponding to a write target block of the flash EEPROM as a transfer destination is set by the firmware prior to the data transfer. In data transfer from a flash EEPROM to the RAM 13, the NAND bus interface 19 extracts LWC data from the data string read out from the flash EEPROM and sets the extracted LWC data.

The ECC data registers 209 to 214 constitute a registers set for holding 6-byte ECC data. In data transfer from the RAM 13 to a flash EEPROM, 6-byte ECC data corresponding to 256-byte write data is generated by the ECC calculating circuit 21 and set in the ECC data registers 209 to 214. In data transfer from a flash EEPROM to the RAM 13, the result of an ECC check calculation performed by the ECC calculating circuit 21 is set in the registers 209 to 214. This ECC check calculation is done for error detection. In this ECC check calculation, 6-byte ECC data corresponding to 256-byte read data is regenerated and compared in units of bytes with 6-byte ECC data actually read out from a flash EEPROM. If the two data agree, "0" is set in bit 0 of the corresponding register. If the two data disagree, "1" is set in bit 0 of the register. If no error has occurred, therefore, "0"s are set in bits 0 of all the ECC data registers 209 to 214.

The NAND chip ready/busy status registers 215-1 to 215-16 hold ready/busy statuses of the 16 flash EEPROMs 11-1 to 11-16. A flag indicating whether the corresponding flash EEPROM is in a ready or a busy state is set in bit 0 of each register by the NAND bus interface 19. A flag "1" is set for the ready state, and a flag "0" is set for the busy state. Whether each chip is in the ready or busy state is determined on the basis of the logical level of the corresponding one of the ready/busy signals (R/B1 to R/B16) independently supplied from the flash EEPROMs 11-1 to 11-16.

A card attribute information register 22 holds card attribute information to be informed to the host system. When the semiconductor disk system 10 is designed according to the PCMCIA, this card attribute information is set by the firmware upon power-on of the system 10. The card attribute information includes information pertaining to physical specifications such as the type, capacity, and access time of a memory chip and information concerning an application, e.g., information indicating that the card is a disk unit. The information held in the card attribute information register 22 is read out and informed to a user in response to a predetermined command from the host system (CPU 1). This information can also contain the name of the product and data indicative of the service life of the product. If it is determined from the write counts of the flash EEPROMs 11-1 to 11-16 that the system 10 is not used so often, information indicating that the system has just begun to be used can be provided to a user. If the flash EEPROMs are rewritten a few tens of thousands of times, information indicating that the system has been used to a certain degree can be provided to a user. Note that the semiconductor disk system 10 can normally operate with no such card attribute information register having the card attribute information.

When the semiconductor disk system 10 is powered on, the card attribute information register 22 is processed as follows. First, in response to the power on of the semiconductor disk system 10, a firmware writes CIS information stored in configuration block pages 12 and 13 shown in FIG. 13 into the card attribute information register 22. This CIS information is preset at a production of the semiconductor disk system 10. After the CIS information is set, the firmware checks an internal service life of the semiconductor disk system 10. In this check processing, the service life information of the system is generated by referring the write counts of the flash EEPROMs 11-1 to 11-16 as mentioned above, and this generated service life information is stored in a section, e.g. a product name section of the CIS information. After these proceedings are completed, the semiconductor disk system 10 goes into a ready state, and the CPU 1 may read the CIS information from the semiconductor disk system 10.

If a wait signal by which the semiconductor disk system 10 requests "wait" to the host system is provided, it is also possible to transfer the card attribute information to the RAM 13 by the microprocessor 15 when the semiconductor disk system 10 is powered on. CIS information transferred to the RAM 13 is transferred to the host system in response to a read request for a predetermined address from the host system. In this case, the card attribute information register 22 need not be provided in the controller 12.

The RAM 13 shown in FIG. 2 is constituted by a dynamic RAM. Part of the storage area of the RAM 13 is used as a data buffer 131 for holding write data to be transferred from the CPU 1 of the personal computer and read data to be read out from the flash EEPROMs 11-1 to 11-16. The RAM 13 is also used as a work area of the microprocessor 15. This work area stores an address conversion table 132 for converting a host address into a memory address, a header table 133 for managing the storage position of block data of one block to be written into a flash EEPROM, and a write count management table 134 for managing the write counts of the flash EEPROMs 11-1 to 11-16 in units of blocks.

A memory map in the semiconductor disk system 10, which is managed by the microprocessor 15, will be described below with reference to FIG. 5.

Figure 5:
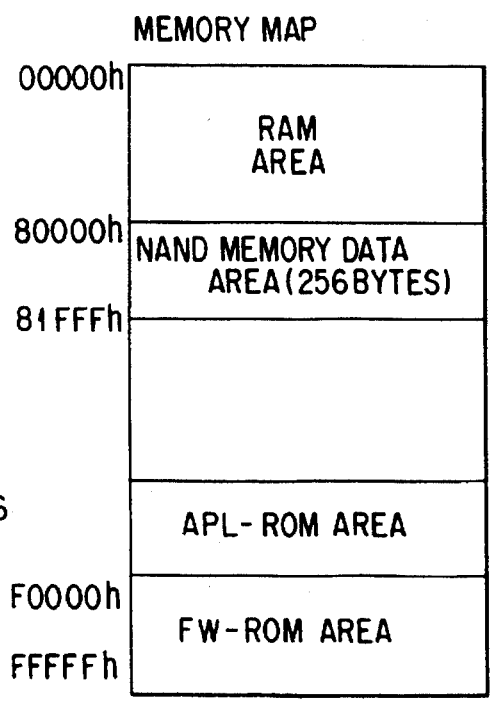
FIG. 5 is a view showing a practical example of a memory map in the semiconductor disk system in FIG. 2.

As shown in FIG. 5, areas mapped in the memory address space managed by the microprocessor 15 include a RAM area, a NAND memory data area, an application ROM (APL-ROM) area, and a firmware ROM (FW-ROM) area.

The RAM area is a memory address space for accessing the RAM 13. The data buffer 131 is allocated to this area.

The NAND memory data area is a 256-byte address space for accessing the flash EEPROMs 11-1 to 11-16. In a data read/write access to the flash EEPROMs 11-1 to 11-16, 256-byte data is transferred by a move string instruction from the microprocessor 15. For this transfer of the 256-byte data, the 256-byte address space is kept as the NAND memory data area. By use of this NAND memory data area, all data transfer between the data buffer 131 and the flash EEPROMs 11-1 to 11-16 can be performed as firmware processing.

The application forms of individual blocks of the flash EEPROMs 11-1 to 11-16 will be described below with reference to FIGS. 6A and 6B.

In addition to storing user data, the blocks of the flash EEPROMs 11-1 to 11-16 are used to store various management information for controlling these flash EEPROMs. Allocation of the user data and the management information with respect to the flash EEPROMs 11-1 to 11-16 is as follows.

Figures 6A, 6B:
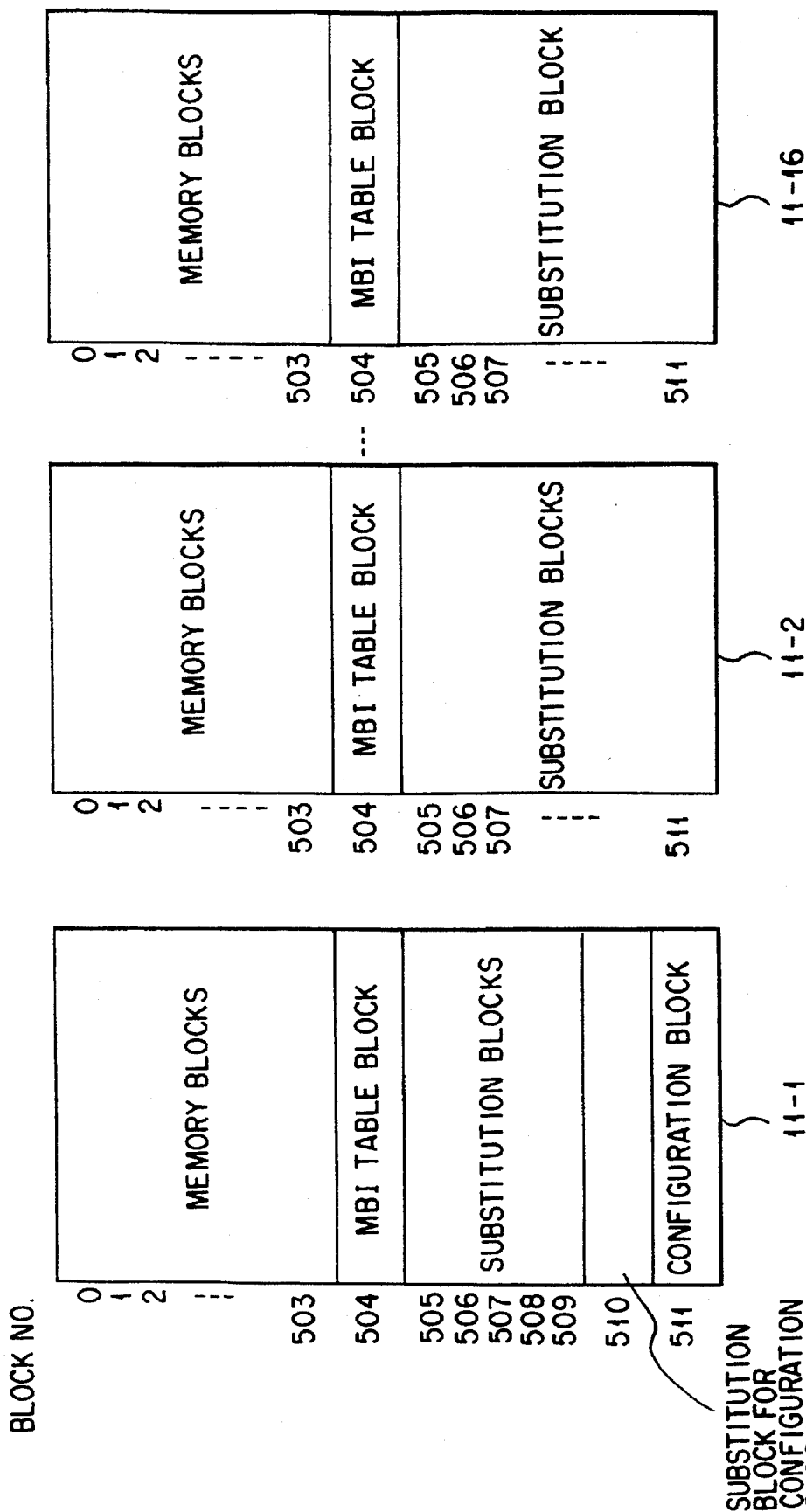
FIGS. 6A and 6B are views showing the utilization forms of a plurality of blocks in the flash EEPROM provided in the semiconductor disk system in FIG. 2.

That is, as illustrated in FIG. 6A, in the NAND type flash EEPROM 11-1 with chip No. #0, 504 blocks from block 0 to block 503 of 512 blocks are used as memory blocks for storing user data. Block 504 is used as an MBI (Memory Block Information) table block for storing management information for managing the addresses and write counts of the 512 blocks in the chip. Block 505 to block 509 are used as substitution blocks for the memory blocks and the MBI table block if failures occur in these blocks. Block 511 is used as a configuration block for storing configuration information of the semiconductor disk system 10. Block 510 is used as a substitution block for the configuration block.

Only one configuration block exists in the entire system 10. In this configuration block, information indicating the number of flash EEPROM chips mounted in the semiconductor disk system 10 and the position of the MBI table block in each flash EEPROM is managed.

As shown in FIG. 6B, in each of the NAND type flash EEPROMs 11-2 to 11-16 with chip Nos. #1 to #16, 504 blocks from block 0 to block 503 are used as memory blocks for storing user data. Block 504 is used as an MBI (Memory Block Information) table block for storing management information for managing the addresses and write counts of 512 blocks in the chip. Block 505 to block 511 are used as substitution blocks for the memory blocks and the MBI block.

The physical block structures of the memory block, the MBI table block, the substitution block, and the configuration block are previously explained with reference to FIG. 3. Data storage formats in these blocks will be described below.

FIG. 7 shows the data storage form of a memory block for storing user data.

As described earlier with reference to FIG. 3, the NAND type flash EEPROM used in this semiconductor disk system 10 is a 16-Mbit chip in which each block consists of 16 pages from page 0 to page 15. Each page is constituted by a 256-byte data area and an 8-byte redundancy area.

Generally, a disk access by the host system is performed in units of 512-byte sectors. The size of 256-byte user data stored in the data area of each page is half that of user data of one sector. In this semiconductor disk system 10, only the 256-byte data area is used in storage of the user data, and the 8-byte redundancy area is not used for this purpose. Therefore, in the semiconductor disk system 10, the 512-byte user data is stored across two consecutive pages in the block. Consequently, the user data stored in one block is data of 8 sectors, e.g., data from sector 0 to sector 7.

That is, as illustrated in FIG. 7, the first 256 bytes of sector 0 are stored in page 0, the last 256 bytes of sector 0 are stored in page 1, the first 256bytes of sector 1 are stored in page 2, the last 256 bytes of sector 1 are stored in page 3, and so on. In this manner, the user data is stored in units of ½ sectors.

The 8-byte redundancy area of each of the pages 0 to 15 is divided into a 2-byte area and a 6-byte area in which an ECC is stored. This ECC corresponds to the 256-byte user data stored in the data area of the same page.

That is, the ECC stored in the redundancy area of page 0 is generated from the 256-byte user data stored in the data area of page 0. Likewise, the ECC stored in the data area of page 1 is generated from the 256-byte user data stored in the data area of page 1.

As described above, in the semiconductor disk system 10, ECCs are generated in units of 256-byte pages, rather than in units of 512-byte sectors, and a data string as an object of the arithmetic operation and the ECC are stored in the same page. For this reason, as in FIG. 7, even if an error occurs such that abnormal cells are produced at the same bit position in a plurality of pages of the flash EEPROM, only one abnormal cell is contained in a data string as an object of the ECC calculation. This makes it possible to perform error detection and correction by a common simple ECC calculation without using any complicated ECC arithmetic expression with a high data recovery capability.

In the two remaining bytes of the redundancy area of page 0, LWC data is stored as block status information of block 0. This LWC data is constituted by the lower bit portion of write count data indicative of the write count of block 0, e.g., data of 10 lower bits of 26-bit wide write count data.

The LWC data is stored in each block. Similarly, in each of block 1 to block 503 the LWC data is stored as block status information in the first two bytes of the redundancy area of the first page.

BAD sector information and ECC error information are stored as sector status information of sector 0 in the two remaining bytes of the redundancy area of page 1.

The BAD sector information is status information which indicates whether sector 0 is a bad sector. In a similar fashion, BAD sector information corresponding to sector 1, sector 2, ..., sector 7 are stored in the two remaining bytes of the redundancy areas of page 3, page 5 ..., page 15, respectively. These pieces of BAD sector information are supplied by the CPU 1 of the personal computer as the host system of the semiconductor disk system 10, when the personal computer implements a format command for formatting the semiconductor disk system 10.

The ECC error information is status information indicating the presence/absence of ECC error in the corresponding sector. This ECC error information is given by the CPU 1 of the personal computer if, for example, an error such as a burst error which can be an ECC error takes place when the personal computer performs a data write by using a WRITE LONG command.

The data storage format of the MBI table block will be described below with reference to FIG. 8.

The MBI table block is constituted by a single block which includes 16 pages from page 0 to page 15. Each page consists of a 256-byte data area and an 8-byte redundancy area. In the last six bytes of the 8-byte redundancy area of each page, an ECC corresponding to 256-byte data stored in the data area of that page is stored. The first two bytes of the redundancy area are left unused.

Figure 8:
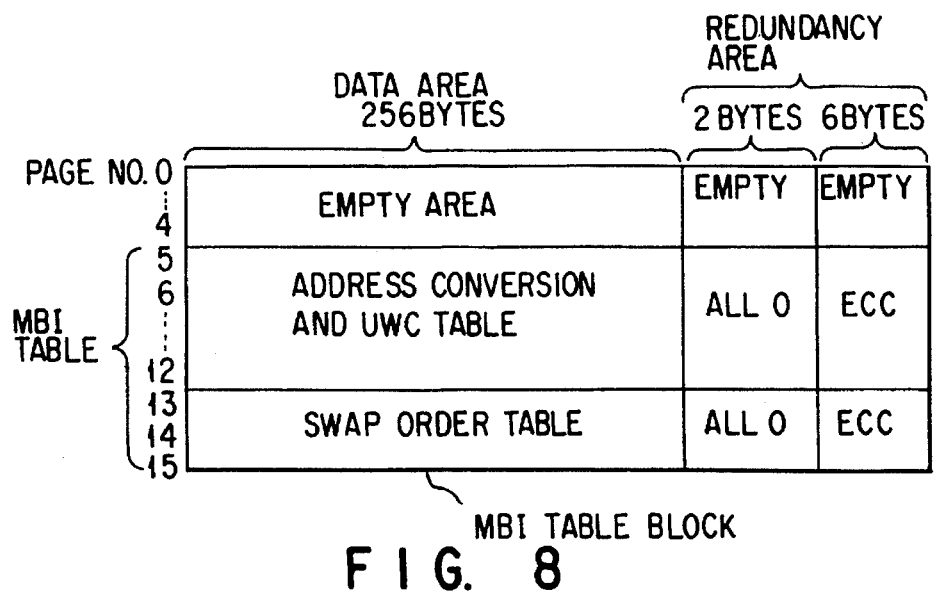
FIG. 8 is a view showing the data storage format of an MBI table block which is one of the blocks illustrated in FIGS. 6A and 6B and used in storage of memory block management information.

As shown in FIG. 8, in the data area of the MBI table block, an address conversion table, a UWC table, and a swap order table are stored.

The address conversion table in the MBI table block holds address conversion information for converting physical block addresses 0 to 511 of blocks 0 to 511 in the chip into host addresses that are defined by the cylinder number, the head number, and the sector number. In this address conversion table, the values of host addresses corresponding to the individual blocks are stored in an order of physical block addresses.

As the value of the host address in the MBI table block, a host logical address calculated from the cylinder number, the head number, and the sector number given by the host system, rather than these numbers themselves, is used.

This host logical address is the serial sector number when consecutive sector numbers are allocated, starting from "0", to all sectors (=8×512×16 sectors) which are allocated to the flash EEPROMs 11-1 to 11-16. Therefore, the bit width of the host logical address is constituted by 16 bits. However, the address conversion information managed by the address conversion table in this MBI table block is for performing address conversion in units of 8 sectors, which is the number of sectors included in one block, rather than in units of sectors. Accordingly, only the 13 upper bits of the 16-bit host logical address are stored in the table in practice.

The UWC table holds UWC (Upper Write Count) data constituted by the upper bit portion of write count data which indicates the write count of each of the 512 blocks in the chip. The UWC data has a width of 16 bits. It is possible to count up to 64 millions of write cycles by the combination of the UWC data and the 10-bit wide LWC data. The value of the UWC data is counted up by one whenever a carry occurs in the corresponding LWC data, i.e., whenever 1024 write cycles take place.

As shown in FIG. 8, these address conversion table and UWC table are stored in a data area from page 5 to page 12 of the MBI table block. When the apparatus is started, i.e., when the semiconductor disk system 10 is powered on, the address conversion table and the UWC table are transferred to the RAM 13 and allowed to reside as the address conversion table 132 and the write count management table 134, respectively.

The swap order table is referred to by the microprocessor 15 during swap processing for swapping blocks. The swap order table holds block addresses indicative of swapping destination blocks (blocks to be swapped) in an order of priorities (in an ascending order of UWC data values). As in FIG. 8, the swap order table is stored in a data area from page 13 to page 15 of the MBI table block. The swap order table is not permitted to reside in the RAM 13 but transferred to the RAM 13 and referred to by the microprocessor 15 when block swapping is to be performed, i.e., when a carry occurs from the LWC data to the UWC data.

FIG. 9 shows the format of the address conversion table and the UWC table.

As in FIG. 9, each storage area for the host address and the UWC data have a data size of two bytes. Since the host address consists of 13 bits as described previously, the three upper bits (bits 15 to 13) of the 2-byte storage area are left unused. The host addresses and the UWC data are alternately arranged in an order of physical block addresses.

That is, in the 256-byte data area of page 5 in the MBI table block, host addresses and UWC data of 64 blocks (blocks 0 to 63) are stored from the start address in the order of a host address corresponding to physical block address 0, UWC data corresponding to physical block address 0, a host address corresponding to physical block address 1, UWC data corresponding to physical block address 1, and so on.

Analogously, in the 256-byte data area of page 12, host addresses and UWC data of 64 blocks (blocks 448 to 511) are stored from the start address in the order of a host address corresponding to physical block address 448, UWC data corresponding to physical block address 448, a host address corresponding to physical block address 449, UWC data corresponding to physical block address 449, and so on.

One example of allocation of the host logical addresses to the flash EEPROMs 11-1 to 11-16 will be described below.

Figure 10:
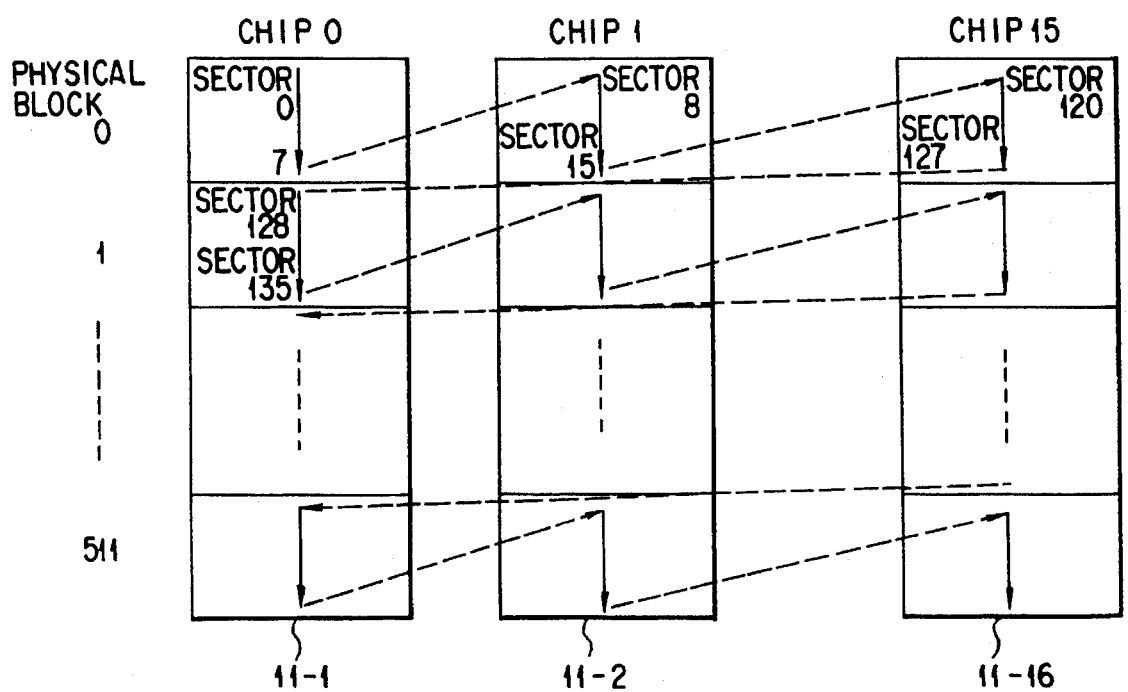
FIG. 10 is a view showing a practical example of host address allocation with respect to a plurality of flash EEPROMs provided in the semiconductor disk system in FIG. 2.

As illustrated in FIG. 10, 8 consecutive sector numbers are allocated to each block of the flash EEPROMs 11-1 to 11-16. 128 sector numbers from sector Nos. 0 to 127 are successively allocated to 16 blocks at physical block address 0 of each of the flash EEPROMs 11-1 to 11-16.

That is, sector Nos. 0 to 7 are allocated to the first block of the flash EEPROM 11-1, sector Nos. 8 to 15 are allocated to the first block of the flash EEPROM 11-2, and sector Nos. 120 to 127 are allocated to the first block of the flash EEPROM 11-16. Sector Nos. 128 to 135 are allocated to the second block of the flash EEPROM 11-1.

In this manner, consecutive sector numbers are allocated to the flash EEPROMs 11-1 to 11-16 so as to cross these chips. Such an address allocation is performed only for memory blocks for storing user data.

FIG. 11 shows the contents of the address conversion and UWC table in the MBI table block of each chip when the above address allocation is performed. In FIG. 11, it is assumed that a total chip number is N, the number of memory blocks per chip is 504, and UWC=0.

FIG. 12 shows the format of the swap order table.

The swap order table is divided into a first order table which corresponds to the first 256 blocks from blocks 0 to 255 and a second order table which corresponds to the last 256 blocks from blocks 256 to 511.

In the first order table, a minimum one of the UWC values in blocks 0 to 255 is stored in an area (addresses 800h and 801h) of the first two bytes.

A value indicating the number of blocks having this minimum UWC value is stored in the next one byte (address 802h).

A value indicating the number of blocks having a value of minimum UWC+1 is stored in the next one byte (address 803h). This "minimum UWC+1" precisely means a value obtained by adding 1 to the minimum UWC (i.e., a value obtained by adding 1 to the write count readable from the minimum UWC) and hence does not indicate the second smallest UWC. The number of blocks having this value of minimum UWC+1 may be zero.

In a similar way, in addresses from 804h to 87Ah, data are sequentially stored from the one indicating the number of blocks having a value of minimum UWC+2 to the one indicating the number of blocks having a value of minimum UWC+120.

Data indicating the write count of the MBI table itself is stored at addresses 87Ch to 87Fh.

Original information as the swap order table is stored at addresses 880h to 97Fh. That is, at the address 880h, the physical block address of a block having the value of the minimum UWC is stored as a value indicating a highest priority block to be swapped of blocks 0 to 255. If a plurality of blocks having the value of the minimum UWC are present, a block having the last physical block address is given the highest priority, and the priority is lowered in a reverse order of physical block addresses. In the same way, the addresses of blocks to be swapped are stored in an order of priorities at addresses 881h to 97Fh.

The second order table will be described below.

In the second order table, a minimum one of the UWC values in blocks 256 to 511, excluding the MBI table block, the substitution blocks, and the configuration block, is stored in an area (addresses 980h and 981h) of the first two bytes. That is, since the write count is not at all incremented in the substitution blocks and the like, the write counts of these blocks are neglected. If substitution actually takes place, UWC of the source of substitution, i.e., the defective block, rather than an actual write count of the substitution block, is used as the value of UWC data of that substitution block. This is to prevent performance from being degraded by frequent occurrence of swap processing. If the value of actual UWC data of the substitution block is directly used, the write count becomes extraordinary to allow a sudden appearance of a small block. As a result, swap processing in which this substitution block is used as an object to be swapped takes place a number of times.

A value indicating the number of blocks having the minimum UWC value is stored in the next one byte (address 982h).

A value indicating the number of blocks having a value of minimum UWC+1 is stored in the next one byte (address 983h). Similarly, at addresses 984h to 9FAh, data are sequentially stored from the one indicating the number of blocks having a value of minimum UWC+2 to the one indicating the number of blocks having a value of minimum UWC+120.

Original information as the swap order table is stored at addresses A00h to AFFh. That is, at the address A00h, the physical block address of a block having the minimum UWC value is stored as a value indicating a highest priority block to be swapped of blocks 256 to 511. If a plurality of blocks having the value of the minimum UWC are present, a block having the last physical block address is given the highest priority, and the priority is lowered in a reverse order of physical block addresses. In the same way, the addresses of blocks to be swapped are stored in an order of priorities at addresses A01h to AFFh.

As described above, in the swap order table, the blocks as swapping destinations are stored in an order of priorities. Consequently, the microprocessor 15 can specify a swapping destination by referring to this swap order table without sorting the UWC data.

Figures 13, 14:
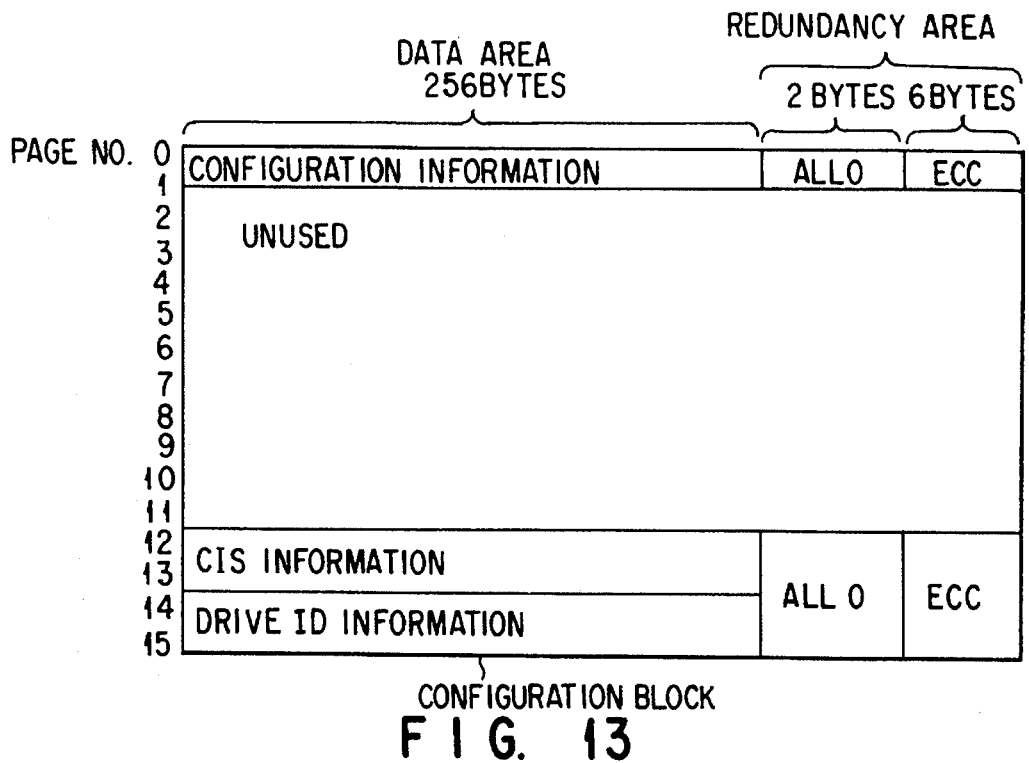
FIG. 13 is a view showing the data storage format of a configuration block which is one of the blocks illustrated in FIG. 6A and used in storage of the configuration information of the semiconductor disk system in FIG. 2.
FIG. 14 is a view showing the arrangement of an address conversion table provided in the RAM of the semiconductor disk system in FIG. 2.

FIG. 13 shows the data storage format of the configuration block.

The configuration block is constituted by a single block containing 16 pages from pages 0 to 15. Each page consists of a 256-byte data area and an 8-byte redundancy area. In 6 bytes of the 8-byte redundancy area of each page, an ECC corresponding to 256-byte data stored in the data area of that page is stored. The two remaining bytes of the redundancy area are left unused.

As in FIG. 13, configuration information, CIS information, and drive ID information area stored in the data area of the configuration block.

The configuration information defines the number of flash EEPROM chips incorporated into this semiconductor disk system 10, a maximum number of chips that can be written at the same time, and a physical block address which indicates the position of the MBI table block in each chip. Upon power-on of the semiconductor disk system 10, the microprocessor 15 refers to this configuration information and performs initialization according to the configuration information.

When the semiconductor disk system 10 is used as a card of the PCMCIA specifications, the CIS information is card attribute information to be informed to the host system. This card attribute information defines information concerning physical specifications such as the type, capacity, and access time of the memory chip and information pertaining to an application, e.g., information indicating that this card is a disk unit. When the semiconductor disk system 10 is powered on, this CIS information is transferred to the card attribute information register 22 by the microprocessor 15. The CIS information transferred to the card attribute information register 22 is then transferred to the host system in response to a read request for a predetermined address from the host system.

The drive ID information shows the drive arrangement of the semiconductor disk system 10. The drive ID information defines a total number of sectors logically allocated to the built-in flash EEPROMs, the number of cylinders, the number of heads, and the number of sectors per track. The drive ID information is transferred to the host system by the microprocessor 15 in response to a drive identification command from the host system.

In this embodiment as has been described above, an ECC corresponding to data stored in the data area of each page is stored in the redundancy area of that page not only in the memory block for storing user data but also in the MBI table block and the configuration block that are used to store management information. Consequently, in these MBI table block and configuration block, it is possible to perform error detection and correction by a normal simple ECC calculation without using any complicated ECC arithmetic expression with a high data recovery capability.

The arrangement of the address conversion table 132 provided in the RAM 13 will be described below with reference to FIG. 14.

This address conversion table 132 is referred to when a host address defined by the cylinder number, the head number, and the sector number is converted into a physical memory address for accessing the flash EEPROMs 11-1 to 11-16. The address conversion table 132 is produced on the basis of the address conversion information of the MBI table block of each of the flash EEPROMs 11-1 to 11-16.

In the address conversion table 132, a 13-bit block sector address is used as the host address. As described earlier, this block sector address consists of the 13 upper bits of the host logical address (16 bits) which is calculated from the cylinder number, the head number, and the sector number and indicative of the serial number of the sector. The physical memory address consists of a 4-bit chip number address and a 9-bit physical block address on chip. The 4-bit chip number address designates one of 16 chips from the flash EEPROM 11-1 with chip No. #0 to the flash EEPROM 11-16 with chip No. #15. The 9-bit physical block address on chip designates one of 512 blocks from blocks 0 to 511 on a chip which is designated by the chip number address. The physical memory addresses (the chip number address and the physical block address on chip) are stored in an order of host addresses.

Figure 15:
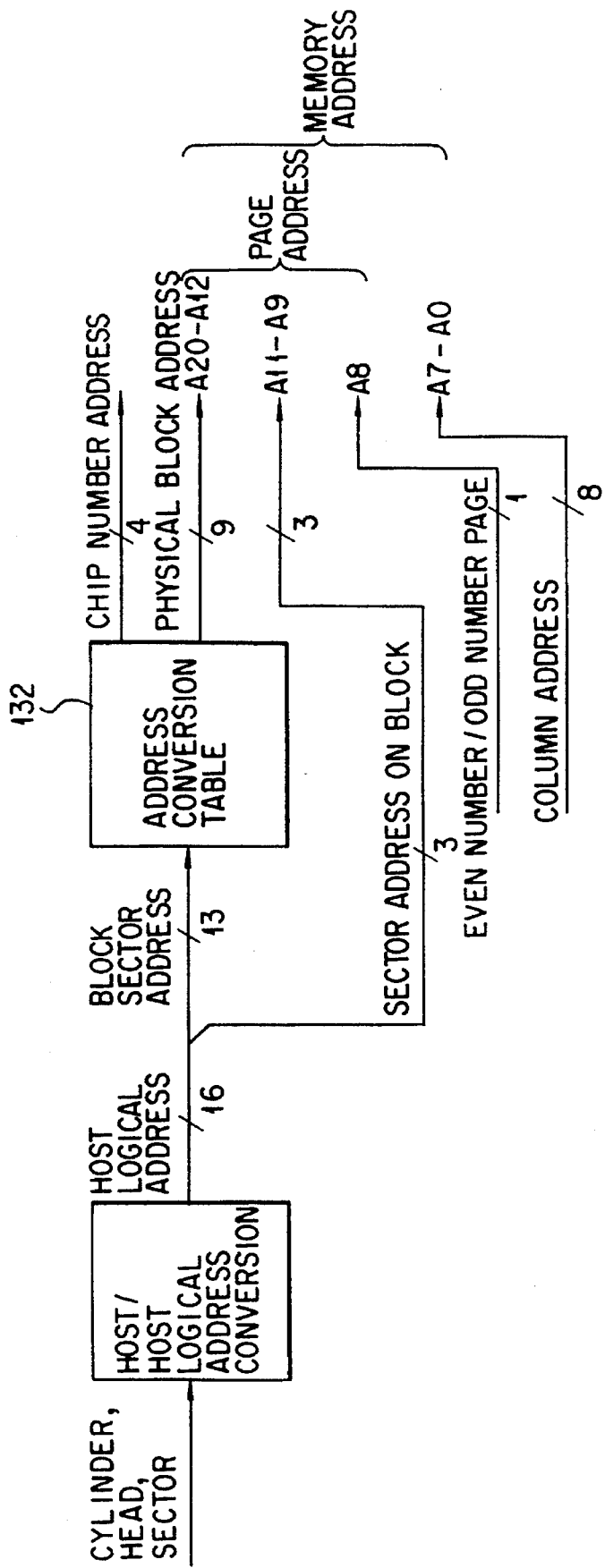
FIG. 15 is a view for explaining the principle of conversion from a host address to a memory address using the address conversion table in FIG. 14.

The principle of address conversion using the address conversion table 132 will be described below with reference to FIG. 15.

First, the cylinder number, the head number, and the sector number that are designated by the host system are converted into a host logical address with a 16-bit width by the firmware executed by the microprocessor 15. The address conversion table 132 is then retrieved using a block sector address consisting of the 13 upper bits of the 16-bit wide host logical address as an index. Consequently, a 4-bit wide chip number address and a 9-bit wide physical block address corresponding to the block sector address are determined.

To select a chip, the chip number address is set in the NAND chip number register 201 of the NAND bus interface 19 by the firmware. The NAND bus interface 19 adds to the 9-bit physical block address a sector address on a block which consists of the three lower bits of the 16-bit wide host logical address, a 1-bit wide even number/odd number page designation address, and an 8-bit wide column address, thereby producing a 20-bit wide memory address (A20 to A0). For address designation, this memory address (A20 to A0) is set in the NAND data read/write register 202 of the NAND bus interface 19. Since the host system accesses the semiconductor disk system 10 in units of sectors in order to read/write user data, both the 1-bit wide even number/odd number page designation address (A8) and the 8-bit wide column address (A7 to A0) are usually all "0"s.

ECC generation/check operations performed by the ECC calculating circuit 21 of the NAND bus interface 19 will be described below.

Figure 16A:
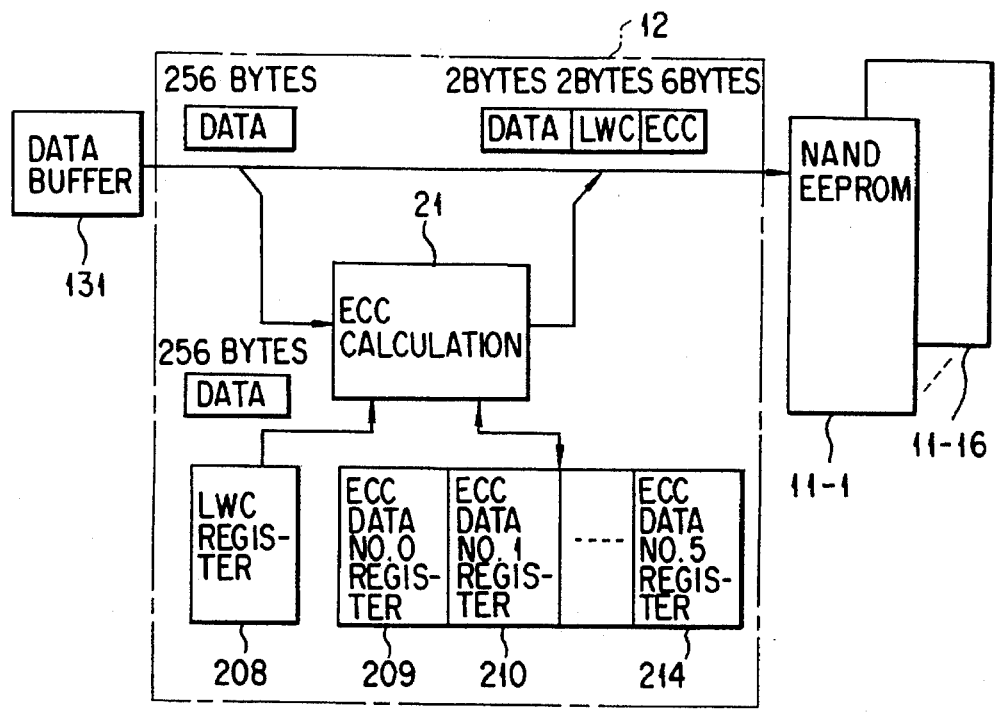

The operation of generating an ECC will be described first with reference to FIG. 16A.

In a data write access to the NAND type flash EEPROMs 11-1 to 11-16, user data stored in the data buffer 131 of the RAM 13 is read out in units of 256 bytes and transferred to the data registers of the flash EEPROMs through the NAND bus interface by the microprocessor 15.

In the controller 12, the 256-byte user data is supplied to the ECC calculating circuit 21 where the calculation for generating an ECC is executed. A Hamming code is an example of the ECC.

In practice, this ECC calculation is performed for 258-byte data consisting of the 256-byte user data plus data to be stored in the first two bytes of the redundancy area, rather than for the 256-byte user data alone.

In the case of a data write access to the first page of each block, for example, 258-byte data consisting of the 256-byte user data and 2-byte LWC data is an object of the ECC calculation. This 2-byte LWC data is set in the LWC register 208 by the microprocessor 15, prior to transferring the 256-byte user data.

The ECC calculating circuit 21 performs the calculation in units of predetermined data strings for the 258-byte data consisting of the 256-byte user data and the 2-byte LWC data set in the LWC register 208, thereby sequentially generating 6-byte Hamming code ECCs. These Hamming code ECCs are temporarily stored in the ECC data registers 209 to 214.

When the generation of ECCs is completed, the ECC calculating circuit 21 transfers the 2-byte LWC data and the 6-byte ECC data, subsequently to the 256-byte user data, to the data registers of the flash EEPROMs. Consequently, data of one page consisting of the 256-byte user data, the 2-byte LWC data, and the 6-byte ECC data is set in the data registers of the flash EEPROMs.

Figure 16B:
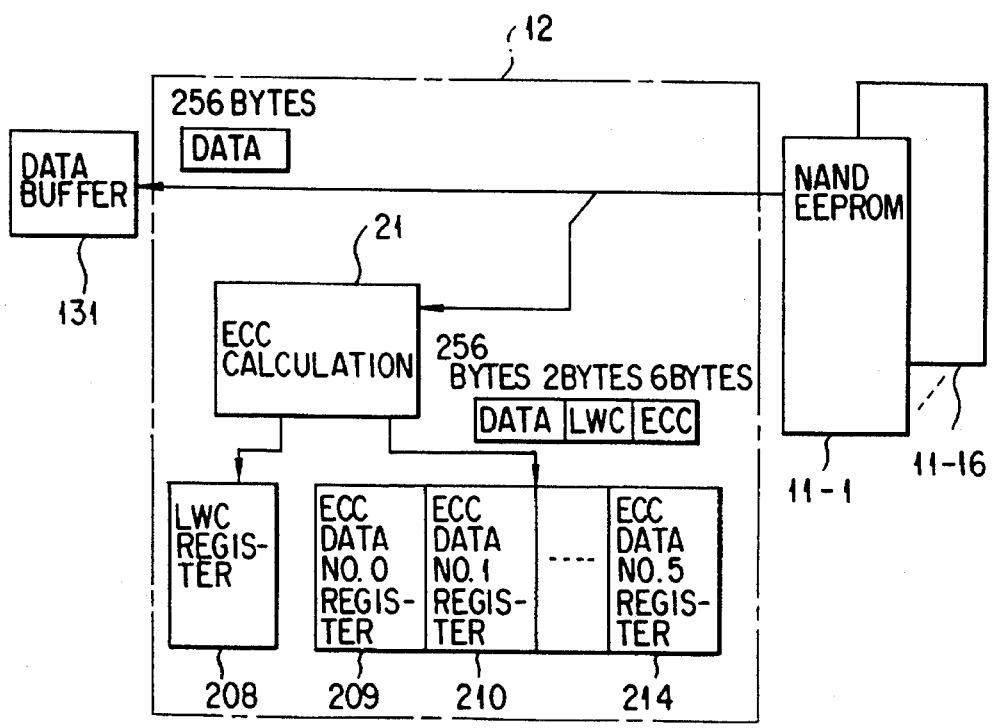

The ECC check operation will be described below with reference to FIG. 16B.

In reading out data from the NAND type flash EEPROMs 11-1 to 11-16, data of one page read out from the flash EEPROMs is supplied to the NAND bus interface 19 of the controller 12.

In the controller 12, 256-byte user data is extracted from the one-page data and transferred to the data buffer 131 of the RAM 13. The one-page data is supplied to the ECC calculating circuit 21.

The ECC calculating circuit 21 extracts LWC data from the one-page data and sets the extracted LWC data in the LWC register 208. Thereafter, the ECC calculating circuit 21 executes an ECC check calculation for error detection.

In this ECC check calculation, the ECC calculating circuit 21 performs the calculation in units of predetermined data strings for the 258-byte data consisting of the 256-byte user data and the 2-byte LWC data as in the ECC generation processing case, thereby sequentially generating 6-byte Hamming code ECCs. The ECC calculating circuit 21 compares, in units of bytes, the generated Hamming code ECCs with Hamming code ECCs contained in the one-page data read out from the flash EEPROMs, and sets the comparison results indicating agreement/disagreement in the ECC data registers 209 to 215. If no error occurs, data "0" indicative of agreement is set in all of the ECC data registers 209 to 215. The contents of the ECC data registers 209 to 215 are referred to by the microprocessor 15. If an error has occurred, the microprocessor 15 performs error correction for the data in the data buffer 131.

To clearly distinguish between the firmware executed by the microprocessor 15 and the function of the NAND bus interface 19, an access control operation for the flash EEPROMs will be described below.

First, the processing of the firmware and the operation of the NAND bus interface 19 necessary to control the program cycle of the flash EEPROMs will be described below with reference to FIGS. 17 and 18A to 18G.

FIG. 17 is a flow chart for explaining the processing of the firmware and the operation of the NAND bus interface 19 in the program cycle. FIGS. 18A to 18G are timing charts showing the operation of the flash EEPROMs in the program cycle.

In the following description, it is assumed that 256-byte user data, 2-byte LWC data, and 6-byte ECC data are written in the first page of a certain block.

The firmware executed by the microprocessor 15 first refers to one of the NAND chip ready/busy registers 215-1 to 215-16 which corresponds to a flash EEPROM as a write target and verifies whether the write target flash EEPROM chip is in a ready (standby) state (step A11). If it is verified that the chip is in the ready state, the firmware performs an I/O write access to the NAND chip number register 201, setting a chip number corresponding to the write target flash EEPROM chip in the register 201 (step A12).

Subsequently, the firmware performs an I/O write access to the NAND chip enable control register 203 to set a CE-ON command for enabling the chip enable input (CE) in the register 203 (step A13).

At that time, the NAND bus interface 19 enables one of the chip select signals CS1 to CS16 which corresponds to the chip number set in the NAND chip number register 201 (step B11). This chip select signal is supplied to the chip enable input CE of the write target chip, and thereby the write target chip is enabled.

The firmware then performs an I/O write access to the NAND command latch enable control register 204 and sets a CLE-ON command for enabling the command latch enable (CLE) signal in the register 204 (step A14).

In response to the set CLE-ON command, the NAND bus interface 19 enables the command latch enable signal CLE, i.e., sets the signal CLE at level "H" (step B12).

Subsequently, the firmware performs an I/O write access to the NAND data read/write register 202 to set a serial data input command "80h" in the register 202 (step A15). In response to the set serial data input command "80h", the NAND bus interface 19 enables the write enable signal WE, i.e., sets the signal WE at level "L", and also transfers the serial data input command "80h" to the input/output terminal I/O (step The firmware then performs an I/O write access to the NAND address latch enable control register 205 to set an ALE-ON command in the register 205 (step A16). In response to the set ALE-ON command, the NAND bus interface 19 enables the address latch enable signal ALE, i.e., sets the signal ALE at level "H" (step B14).

Subsequently, the firmware performs an I/O write access to the NAND data read/write register 202 and sets a memory address (column address bits A7 to A0 and page address bits A20 to A8) in the register 202 (step A17). In response to the set address, the NAND bus interface 19 enables the write enable signal WE, i.e., sets the signal WE at level "L", and also transfers the set memory address to the input/output terminal I/O (step B15).

The firmware sets LWC data in the LWC register 208 (step A18). This LWC data is previously read out from the write target block and counted up by one prior to execution of this program cycle. The firmware then sets an ECC start command in the ECC start command register 206 (step A19). Thereafter, the firmware executes the move string instruction to transfer the 256-byte user data from the data buffer 131 to the flash EEPROM (step A20).

Figure 18:
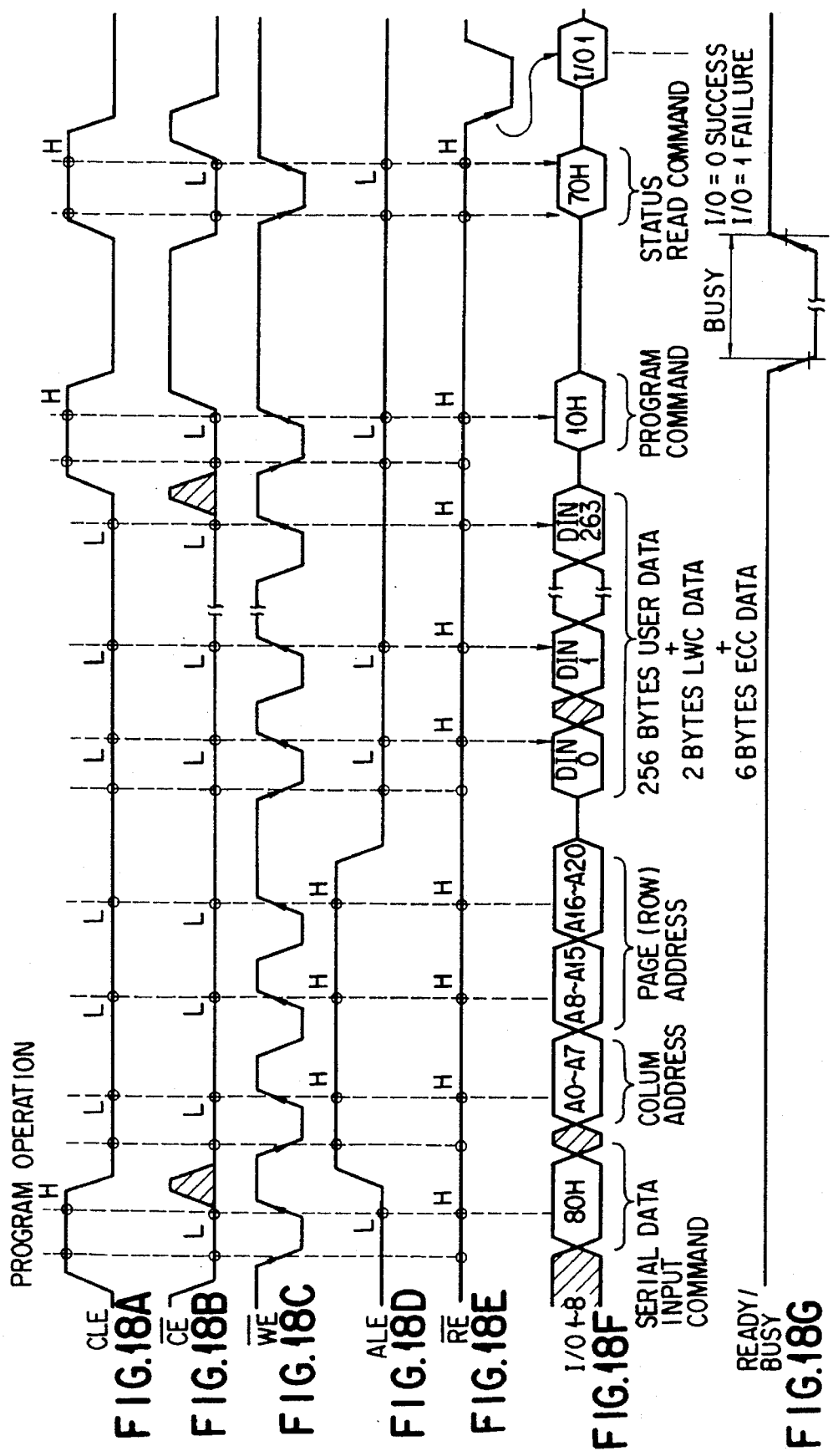

In response to the ECC start command, the NAND bus interface 19 starts the calculation for generating an ECC and generates 6-byte ECC data corresponding to the 256-byte user data and the LWC data (step B16). Subsequently to the 256-byte user data, the NAND bus interface 19 starts transferring the 2-byte LWC data and the 6-byte ECC data (step B17). As a consequence, as illustrated in FIG. 18F, the 256-byte user data, the 2-byte LWC data, and the 6-byte ECC data are transferred as serial input data (DIN) of one page.

Thereafter, the firmware issues the CLE-ON command and performs an I/O write access to the NAND data read/write register 202 to set a program command "10h" in the register 202 (step A21). The NAND bus interface 19 first enables the command latch enable signal CLE and then the write enable signal WE. The NAND bus interface 19 also transfers the program command "10h" to the input/output terminal I/O (step B18).

When this program command "10h" is transferred, a page write operation is automatically executed in the write target flash EEPROM.

In the page write operation, page data of one page is transferred from the data register to the memory cell array. The 256-byte user data stored in the data register is written in the data area of that page. In addition, the 2-byte LWC data and the 6-byte ECC data stored in the data register are also written in the redundancy area of the page. Thereafter, verification is performed to check whether the page write operation is normally executed. In this verification, the contents of the page subjected to the page write are read out and compared with the contents held in the data register. If these contents disagree, the page write is retried. The page write operation is ended if the page write access is successfully done or if the page write access is not successfully done even after it is executed a predetermined number of times.

During the period of the page write operation, the ready/busy signal (RDY/BSY) from the write target chip indicates the busy state. The ready/busy signal returns from the busy state to the ready state when the page write operation is completed.

To simultaneously implement write operations for a plurality of chips, a write access to a certain chip is executed by using a period (busy state) during which a page write operation is being executed for some other chip.

Thereafter, the firmware verifies the completion of the page write operation in accordance with the contents of the NAND chip ready/busy register corresponding to the chip that is subjected to the write access (step A22). The firmware then performs an I/O write access to the NAND data read/write register 202 to set a status read command "70h" in the register 202 (step A23). In response to the set status read command "70h", the NAND bus interface 19 enables the write enable signal WE, i.e., sets the signal WE at level "L", transfers the status read command "70h" to the input/output terminal I/O, and enables the read enable signal RE, i.e., sets the signal RE at level "L" (step B19).

When the status read command "70h" is transferred, status data which indicates whether the page write operation is successfully done is read out from the flash EEPROM. This status data is set in the NAND data read/write register 202.

By referring to the status data in the NAND data read/write register 202, the firmware verifies whether the page write operation is normally completed. If the write operation is normally completed, the firmware ends the write operation (step A24). If the write operation is failed, the firmware performs, e.g., substitution with a substitution block.

The processing of the firmware and the operation of the NAND bus interface 19 required to control the read cycle of the flash EEPROMs will be described below with reference to FIGS. 19 and 20A to 20G.

Figure 19:
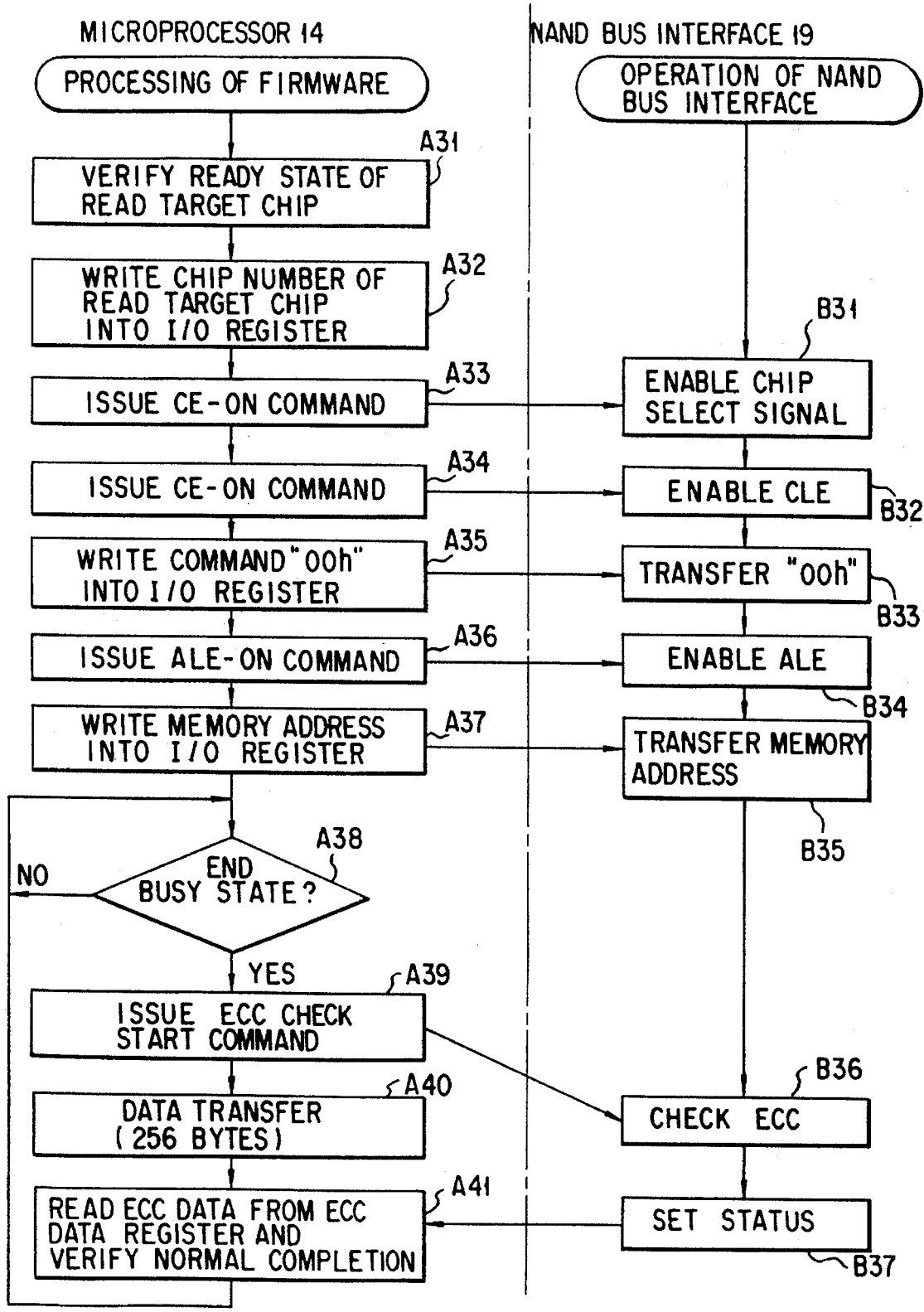
FIG. 19 is a flow chart for explaining the relationship between the processing of firmware and the operation of hardware when data is read out from a flash EEPROM of the semiconductor disk system in FIG. 2.
Figure 20:
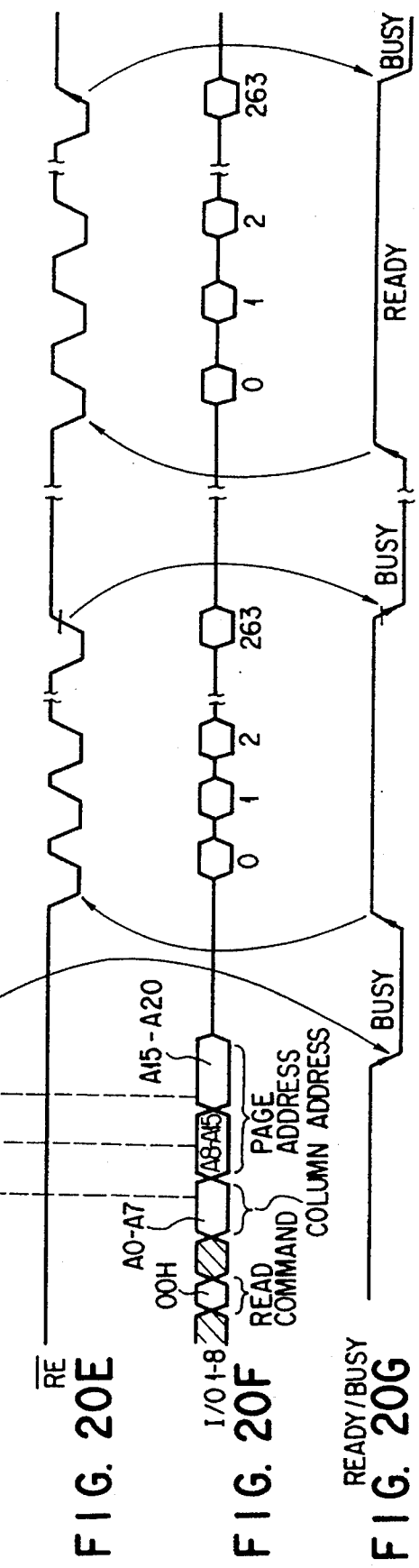

FIG. 19 is a flow chart for explaining the processing of the firmware and the operation of the NAND bus interface 19 in the read cycle. FIGS. 20A to 20G are timing charts showing the operation of the flash EEPROMs in the read cycle.

The read cycle of the flash EEPROMs 11-1 to 11-16 includes a first read cycle in which data is read out in units of pages and a second read cycle in which only data stored in the redundancy area of each page is read out.

To begin with, the case in which the first page of a certain block is read out in the first read cycle will be described below.

The firmware which is executed by the microprocessor 15 first refers to one of the NAND chip ready/busy registers 215-1 to 215-16 which corresponds to a flash EEPROM as a read target and verifies whether this read target flash EEPROM is in a ready (standby) state (step A31). If it is verified that the chip is in the ready state, the firmware performs an I/O write access to the NAND chip number register 201, setting a chip number corresponding to the read target flash EEPROM chip in the register 201 (step A32).

Subsequently, the firmware performs an I/O write access to the NAND chip enable control register 203 to set the CE-ON command for enabling the chip enable input (CE) (step A33).

At that time, the NAND bus interface 19 enables one of the chip select signals CS1 to CS16 which corresponds to the chip number set in the NAND chip number register 201 (step B31). This chip select signal is supplied to the chip enable input CE of the read target chip, and thereby the read target chip is enabled.

The firmware then performs an I/O write access to the NAND command latch enable control register 204 and sets the CLE-ON command for enabling the command latch enable (CLE) signal in the register 204 (step A34).

In response to the set CLE-ON command, the NAND bus interface 19 enables the command latch enable signal CLE, i.e., sets the signal CLE at level "H" (step B32).

Subsequently, the firmware performs an I/O write access to the NAND data read/write register 202 to set a read command "00h" in the register 202 (step A35). In response to the set read command "00h", the NAND bus interface 19 enables the write enable signal WE, i.e., sets the signal WE at level "L", and also transfers the read command "00h" to the input/output terminal I/O (step B33).

The firmware then performs an I/O write access to the NAND address latch enable control register 205 to set the ALE-ON command in the register 205 (step A36). In response to the set ALE-ON command, the NAND bus interface 19 enables the address latch enable signal ALE, i.e., sets the signal ALE at level "H" (step B34).

Subsequently, the firmware performs an I/O write access to the NAND data read/write register 202 and sets the memory address (column address bits A7 to A0 and page address bits A20 to A8) in the register 202 (step A37). In response to the set address, the NAND bus interface 19 enables the write enable signal WE, i.e., sets the signal WE at level "L", and also transfers the set memory address to the input/output terminal I/O (step B35).

When the memory address is transferred, a page read operation is executed in the read target flash EEPROM. In this page read operation, 256-byte user data, 2-byte LWC data, and 6-byte ECC data stored in the page designated by the memory address are read out and transferred to the data register. During this page read operation period, the ready/busy signal (RDY/BSY) from the read target chip indicates the busy state. When the page read operation is completed, the signal returns from the busy state to the ready state.

The firmware verifies the completion of the page read operation in accordance with the contents of the NAND chip ready/busy register corresponding to the chip which is subjected to the read access (YES in step A38). The firmware then sets the ECC start command in the ECC start command register 206 (step A39). Thereafter, the firmware executes the move string instruction to transfer the 256-byte user data from the data buffer 131 to the flash EEPROM (step A40).

In this data transfer, in synchronism with the output read enable signal RE from the NAND bus interface 19, the (256+8)-byte data held in the data register of the flash EEPROM is read out serially in units of bytes.

The NAND bus interface 19 performs a check calculation for error detection to the readout data from the flash EEPROM (step B36). The NAND bus interface 19 sets the check result in the ECC data registers 209 to 214 (step B37).

After verification of the completion of the ECC check calculation, the firmware checks whether the data is normally read by referring to the contents of the ECC data registers 209 to 214 (step A41). If it is detected that an error has occurred in the read data, the firmware executes error correction for the 256-byte user data transferred to the data buffer 131 by using the ECC check calculation result set in the ECC data registers 209 to 214.

As described above, in the read cycle, the NAND bus interface 19 automatically executes the ECC check when data is transferred from a flash EEPROM to the data buffer 131.

Each of the flash EEPROMs 11-1 to 11-16 has a page increment function. When data of one page is completely read out from the data register, this page increment function automatically starts to read the next page. With this function, when the serial data read from the first page described above is completed, the flash EEPROM is again set in the busy state to start a page read from the second page.

For data reads from the second and subsequent pages, therefore, the firmware and the NAND bus interface 19 can efficiently read out a plurality of continuous pages only by repeating steps A38 to A41 and steps B36 and B37, respectively, without executing the address cycle in steps A31 to A37 and steps B31 to B35 again.

The operations performed when only the data in the redundancy area is read out in the second read cycle will be described below.

The operations of the firmware and the NAND bus interface 19 necessary to implement this second read cycle are almost the same as those in the first read cycle except for the following two points.

(1) In step A35 in FIG. 19, the firmware issues a command "50h" instead of the command "00h".

(2) The sequence of the read cycle is completed when 2-byte data is read out from the data register.

Accordingly, the LWC data can be read out only by executing the second read cycle once. To read out the ECC data, however, it is necessary to repeat the second read cycle three times.

Note that in the second read cycle, the position of the data register from which data is to be read out can be determined in accordance with the value of the column address set in the address cycle.

In this embodiment, the semiconductor disk system 10 has a pre-read function which, in performing data transfer corresponding to the data read command, reads out data in a sector ahead of the current sector from the flash EEPROMs 11-1 to 11-16. This pre-read function will be described below with reference to FIGS. 25A and 25B. In the following description it is assumed that one read command indicates a data read request in units of two sectors. Such a data read request in units of two or more sectors can be changed in accordance with the parameter setting by the host system.

FIG. 25A shows the processing times of data transfer (NAND→RAM) from a flash EEPROM to the RAM 13 and data transfer (RAM→HOST) from the RAM 13 to the host system in this embodiment. As in FIG. 25A, in this embodiment, after the second sector is read out according to the issue of the first read command, data in the succeeding sector (third sector) of the second sector is read out (the hatched block). That is, while the second sector is being transferred from the RAM 13 to the host system in accordance with the first read command, the data in the third sector subsequent to the second sector is already read out from the flash EEPROM. Therefore, if a read command sent subsequently to the first read command requests a data read access from the sector following the second sector, the data in the third sector can be transferred to the host system immediately after this second read command is issued, without reading the data from the flash EEPROM. If the second read command requests a read access of data from a sector not subsequent to the second sector, a data read access is, of course, executed again from the requested sector.

In a conventional semiconductor disk system, as illustrated in FIG. 25B, data is read out from a flash EEPROM in accordance with the issue of the second read command. Therefore, even if the secondly issued read command requests a data read access from the succeeding sector (third sector) of the second sector indicated by the firstly issued read command, it is necessary to read data from the third sector of the flash EEPROM in accordance with the issue of the second read command.

As described above, the pre-read function of this embodiment makes it possible to efficiently transfer data to the host system if read requests for consecutive sectors are successively issued. As an example, in the case of a one-sector sequential read access, the data transfer rate that is conventionally 1.0 Mbyte/sec can be increased to 1.5 Mbytes/sec.

The processing of the firmware and the operation of the NAND bus interface 19 required to control the block erase cycle of a flash EEPROM will be described below with reference to FIGS. 21 and 22A to 22G.

FIG. 21 is a flow chart for explaining the processing of the firmware and the operation of the NAND bus interface 19 in the block erase cycle. FIGS. 22A to 22G are timing charts showing the operation of a flash EEPROM in the block erase cycle.

In the following description, assume that the stored contents in one particular block are to be erased.

The firmware executed by the microprocessor 15 first refers to one of the NAND chip ready/busy registers 215-1 to 215-16 which corresponds to a flash EEPROM including an erase target block and verifies whether the erase target flash EEPROM chip is in a ready (standby) state (step A51). If it is verified that the chip is in the ready state, the firmware performs an I/O write access to the NAND chip number register 201, setting a chip number corresponding to the erase target flash EEPROM chip in the register 201 (step A52).

Subsequently, the firmware performs an I/O write access to the NAND chip enable control register 203 to set the CE-ON command for enabling the chip enable input (CE) (step A53).

At that time, the NAND bus interface 19 enables one of the chip select signals CS1 to CS16 which corresponds to the chip number set in the NAND chip number register 201 (step B51). This chip select signal is supplied to the chip enable input CE of the erase target chip, and thereby the erase target chip is enabled.

The firmware then performs an I/O write access to the NAND command latch enable control register 204 and sets the CLE-ON command for enabling the command latch enable (CLE) signal in the register 204 (step A54).

In response to the set CLE-ON command, the NAND bus interface 19 enables the command latch enable signal CLE, i.e., sets the signal CLE at level "H" (step B52).

Subsequently, the firmware performs an I/O write access to the NAND data read/write register 202 to set an erase command "60$h$" in the register 202 (step A55). In response to the set erase command "60$h$", the NAND bus interface 19 enables the write enable signal WE, i.e., sets the signal WE at level "L", and also transfers the erase command "60$h$" to the input/output terminal I/O (step B53).

The firmware then performs an I/O write access to the NAND address latch enable control register 205 to set the ALE-ON command in the register 205 (step A56). In response to the set ALE-ON command, the NAND bus interface 19 enables the address latch enable signal ALE, i.e., sets the signal ALE at level "H" (step B54).

Subsequently, the firmware performs an I/O write access to the NAND data read/write register 202 and sets a memory address (block address bits A20 to A12) in the register 202 (step A57). In response to the set address, the NAND bus interface 19 enables the write enable signal WE, i.e., sets the signal WE at level "L", and also transfers the set memory address to the input/output terminal I/O (step B55).

Thereafter, the firmware issues the CLE-ON command and performs an I/O write to the NAND data read/write register 202, thereby setting an erase start command "D0$h$" in the register 202 (step A58). The NAND bus interface 19 first enables the command latch enable signal CLE, then enables the write enable signal WE, and transfers the erase start command "D0$h$" to the input/output terminal I/O (step B56).

When this erase start command "D0$h$" is transferred, a block erase operation and a verification operation for the block erase are automatically executed in the erase target flash EEPROM.

In the block erase operation, only the stored contents in the block designated by the block addresses are erased. During the period of the block erase operation, the ready/busy signal (RDY/BSY) from the erase target chip indicates the busy state. The ready/busy signal returns from the busy state to the ready state when the block erase operation is completed.

Thereafter, the firmware verifies the completion of the block erase operation in accordance with the contents of the NAND chip ready/busy register corresponding to the chip that is subjected to the erase (YES in step A59). The firmware then performs an I/O write access to the NAND data read/write register 202 to set a status read command "70$h$" in the register 202 (step A60). In response to the set status read command "70$h$", the NAND bus interface 19 enables the write enable signal WE, i.e., sets the signal WE at level "L", transfers the status read command "70$h$" to the input/output terminal I/O, and enables the read enable signal RE, i.e., sets the signal RE at level "L" (step B57).

When the status read command "70$h$" is transferred, status data which indicates whether the block erase operation is successfully done is read out from the flash EEPROM. This status data is set in the NAND data read/write register 202.

By referring to the status data in the NAND data read/write register 202, the firmware verifies whether the block erase operation is normally completed. If the write operation is normally completed, the firmware ends the erase cycle (step A61). If the write operation is failed, the firmware performs, e.g., substitution with a substitution block.

Note that it is also possible to execute a multi-block operation for sequentially erasing a plurality of blocks by setting a plurality of block addresses by repetitively executing steps A54 to A57 prior to issuing the block erase start command "D0*h*".

Figure 23A:
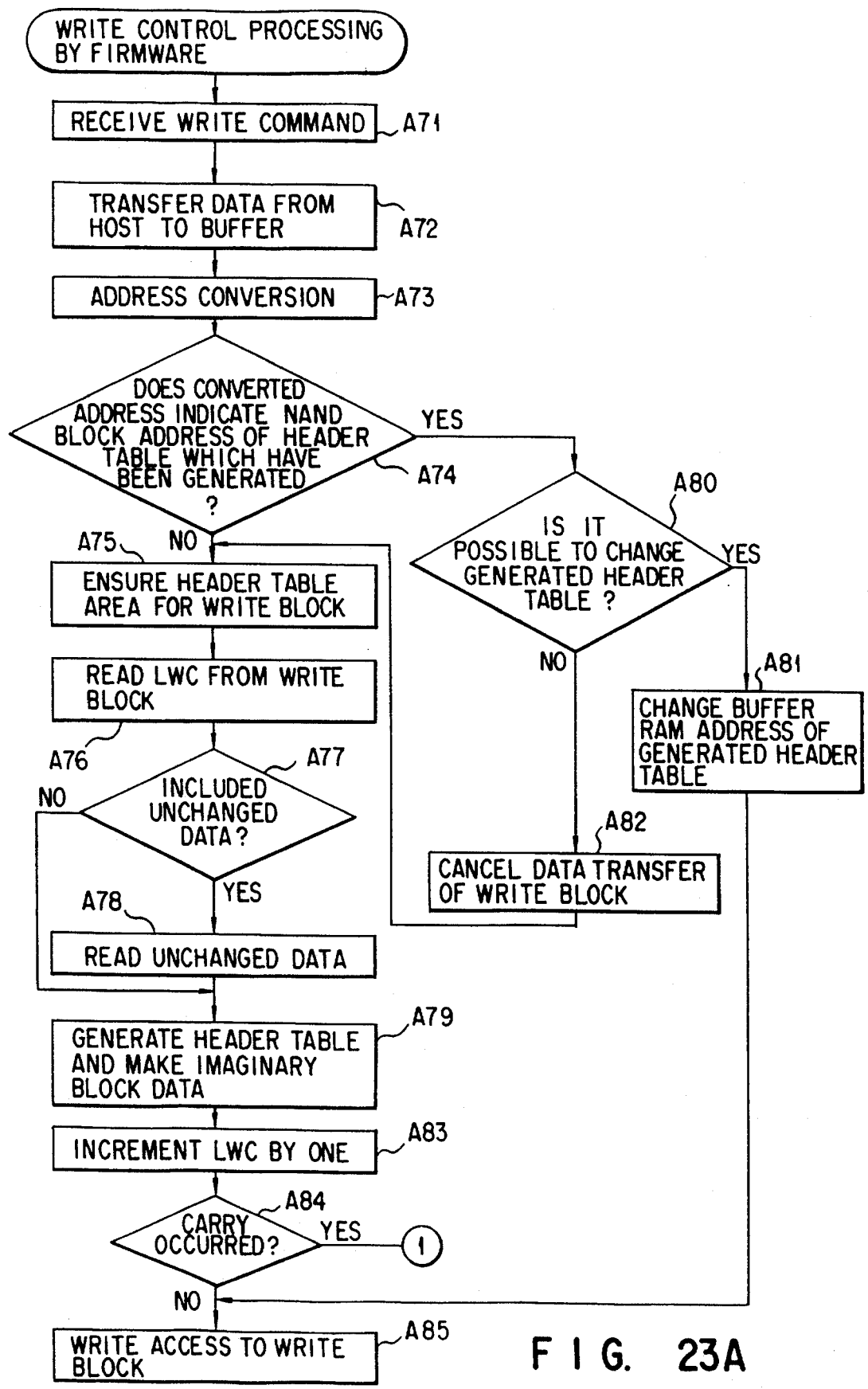

A write control operation performed in the overall semiconductor disk system 10 (FIG. 2) when the host system issues a write command will be described below with reference to the flow charts in FIGS. 23A and 23B. This write control operation is accomplished by using the various management information tables described previously.

When the host system sets a write command in the command register 176 of the external bus interface 17, the firmware that is executed by the microprocessor 15 first receives this write command (step A71). The firmware then starts transferring write data from the host system to the data buffer 131 (step A72). This data transfer is implemented via the data register 173 of the external bus interface 17.

Since an access to the semiconductor disk system 10 by the host system is done in units of sectors, write data of at least one sector is stored in the data buffer 131.

Subsequently, the firmware reads out the host address for the disk access designated by the host system, i.e., the sector number, the cylinder number, and the header number, from the sector number register 171, the cylinder register 174, and the drive/head register 175, respectively, and converts the address into an address for accessing the flash EEPROMs 11-1 to 11-16 (step A73). This address conversion is accomplished by using the address conversion table 132 as described previously with reference to FIG. 15. The address conversion information in this address conversion table 132 is created, when the system 10 is started, on the basis of the address conversion information of the address conversion tables read out from the flash EEPROMs 11-1 to 11-16.

As a result of the address conversion, the chip number of the write access target and the memory address (A20 to A0) on chip of the write access target are generated.

Thereafter, the firmware checks whether the address generated to access the flash EEPROMs 11-1 to 11-16 agrees with the NAND block address indicated in the header table which has been generated (step A74). If the address generated in step A73 differs from the NAND block address indicated in the header table already generated, the firmware advances to processing (steps A75 to A79) for generating write data of one block which corresponds to a block (to be referred to as a write block hereinafter) of the write access target designated by the nine upper bits (A20 to A12) of the memory address (A20 to A0).

The firmware first ensures a header table area for the write block in the RAM 13 (step A75) and then reads out LWC data from the first page of the write block (step A76). In this LWC data read processing, the second read cycle using the command "50*h*" mentioned earlier is implemented. Consequently, the LWC data alone is read out from the first page of the write block. The readout LWC data is stored in an empty area of the RAM 13 or in the data buffer 131.

Thereafter, the firmware checks whether "unchanged data" is included in the write block (step A77). This "unchanged data" means data which is present in the write block but is not requested for rewrite access by the host system. Therefore, no "unchanged data" exists if a write to all pages in the write block is requested. However, the "unchanged data" exists if a write is started from an intermediate page in the write block or if the data length of the write data is smaller than one block (8 sectors).

If the "unchanged data" exists, the firmware executes the first read cycle using the command "00*h*" to read a page containing this "unchanged data" from the write block (step A78). This page including the "unchanged data" is stored in an empty area of the RAM 13 or in the data buffer 131.

Subsequently, the firmware generates a header table corresponding to the block data of one block to be written into the write block, on the basis of the RAM address which represents the storage position of the readout "unchanged data" in the RAM 13 and the RAM address which represents the storage position of the write data, that is supplied from the host system, in the RAM 13.

That is, the firmware does not generate the block data of one block by actually combining the data; the firmware generates the header table 133 which holds the address of the "unchanged data" in the RAM 13 and the address of the write data in the data buffer 131 such that these addresses are arranged in an order of page numbers, thereby making imaginary block data (step A79).

Assume that, in step A74 described above, the address generated in step A73 is consistent with the NAND block address in the header table previously generated, or that a plurality of header tables are generated. In this case, if that address is equal to the NAND block address indicated in any of these header tables (YES in step A74), the firmware checks whether new write data can be additionally written in this NAND block (write block) (step A80). That is, the firmware checks whether the data corresponding to the page which is designated by the address generated in step A73 has already been transferred to the write target flash EEPROM.

If the data corresponding to the page designated by the address generated in step A73 has not been transferred yet, the firmware determines that the write data can be additionally written (YES in step A80). In this case, the firmware changes the buffer RAM address of the previously generated header table so that the write data transferred from the host system is incorporated into the data (imaginary block data) to be written into the write access target block (step A81). After the buffer RAM address is changed, the new imaginary block data including the write data transferred from the host system is transferred to the flash EEPROM in units of pages.

If the data corresponding to the page designated by the generated address has already been transferred to the flash EEPROM in step A73, the firmware determines that the write data cannot be additionally written (NO in step A80). In this case, the firmware cancels the transfer of the imaginary block data currently being subjected to the write access and performs the processing from step A75, thereby generating a new address header table. Consequently, erasure is executed again for the write access target block, a new header table is generated, and new imaginary block data is created.

When the imaginary block data is created, the possibility exists that the writing process of the "unchanged data" corresponding to the new command into the flash EEPROM is not completed. Therefore, the "unchanged data" of a sector which is involved the erase processing, is copied among the buffer RAM, or a process in order to use buffer RAM addresses corresponding to the sector data, on a header table which is to be newly generated is executed. This process is executed as a substitute for a reading the "unchanged data" of a sector which is involved the erase processing from the flash EEPROM.

The firmware updates the value of the LWC data read out from the write block by incrementing the value by one (step A83). In this case, if no carry occurs in the value of the LWC data, the firmware executes a write access to that write block (steps A84 and A85).

In this write access processing, the block erase cycle previously described with reference to FIG. 21 is first executed for the write block, erasing all contents of the write block. The program cycle explained earlier with reference to FIG. 17 is then implemented for all pages of the write block. In this program cycle, the firmware first sets the updated LWC data in the LWC register 208 of the NAND bus interface 19. Subsequently, the firmware reads out data of one block in units of 256 bytes from the RAM 13 following the order of the addresses held in the header table 133, and transfers the readout data to the flash EEPROM. In this manner, by using the header table 133, the firmware can perform data transfer without distinguishing between the write data and the "unchanged data".

Each 256-byte data to be transferred is automatically added with ECC data by the NAND bus interface 19 and written in the corresponding page of the write block of the write target flash EEPROM.

On the other hand, if a carry occurs in the value of the LWC data, the firmware performs the following processing to check whether swap processing is to be executed.

That is, the firmware implements the first read cycle to read out the MBI table block from the write target flash EEPROM (step A86). The contents of the readout MBI table block are stored in an empty area of the RAM 13.

The firmware then retrieves the MBI table block to detect UWC data corresponding to the write block and updates the value of the UWC data, i.e., increments the value by one (step A87). As described earlier with reference to FIG. 9, the UWC data are arranged in an order of physical block addresses in the MBI table block. Therefore, the firmware can readily find the UWC data corresponding to the write block by using the physical block address indicative of the write block as an index.

The updated value of the UWC data is reflected on both the MBI table block and the write count management table 134.

Thereafter, the firmware sequentially compares the updated value of the UWC data of the write block with the value of minimum UWC data of the write target chip and with the values of minimum UWC data of other chips (step A88).

As the value of the minimum UWC data of the write target chip, the value of minimum UWC data held in the swap order table in the MBI table block read out from the write target chip is used. In this way, the value of the minimum UWC data of the write target chip can be easily known without performing, e.g., processing of sorting the write count management table in the RAM 13 in an ascending order of UWC data values.

As the values of the minimum UWC data of other chips, the values in the write count management table 134 in the RAM 13 are used. The use of the values in this write count management table 134 eliminates the need for sequential read operations of the MBI table blocks from all chips except for the write target chip. This effectuates high-efficiency swap determination processing.

On the basis of the comparison result in step A84, the firmware checks whether the difference between the value of the updated UWC data of the write block and the value of the minimum UWC data of the write target chip is a predetermined threshold value ($\alpha$) or more (step A89). If the difference is $\alpha$ or larger, the firmware performs swap processing in the write target chip (step A90).

In this swap processing in the chip, the firmware first reads out a block to be swapped from the write target chip. This block to be swapped is a block having the value of the minimum UWC. The physical block address of the block is designated by the block number with swapping priority No. 1 in the swap order table contained in the MBI table block read in step A86. Therefore, without sorting the UWC data, the firmware can easily determine the block to be swapped and recognize the physical block address of that block.

Subsequently, the firmware swaps the addresses of the write block and the block to be swapped. By this swapping, the address conversion information of both the address conversion table 132 in the RAM 13 and the MBI table block read out from the write target chip are updated.

To swap the stored contents of the write block and the block to be swapped in the write target flash EEPROM, the firmware performs a write access by which the contents of the block to be swapped which are read out into the RAM 13 are written into the write block of the write target flash EEPROM, and a write access by which the write data of one block stored in the RAM 13 is written into the block to be swapped of the flash EEPROM. Thereafter, to update the MBI table block of the write target flash EEPROM, the firmware performs a write access by which the contents of the updated MBI table block stored in the RAM 13 are written into the MBI table block of the write target flash EEPROM. These three write accesses are executed in a form similar to that explained in step A85.

Processing performed when the difference between the value of the updated UWC data of the write block and the value of the minimum UWC of the write target chip is smaller than will be described below.

In this case, the firmware checks whether the difference between the updated UWC data of the write block and the value of the minimum UWC data of any of other chips is a predetermined threshold value ($\alpha+\beta$) or larger (step A91). If the difference is ($\alpha+\beta$) or larger, the firmware performs swapping between the write target chip and the chip which has this minimum UWC data value (step A92).

In this swap processing between these chips, the firmware reads out the MBI table block from the chip having the block to be swapped into the RAM 13, and checks the block number with swapping priority No. 1 in the swap order table included in the MBI table block. By using the physical block address indicated by the block number with swapping priority No. 1, the firmware then reads out the block to be swapped from the chip to be swapped.

Subsequently, the firmware swaps the host addresses of the write block and the block to be swapped. By this swapping, the firmware updates the address conversion information of each of the address conversion table 132 in the RAM 13, the MBI table block read out from the write target chip, and the MBI table block read out from the chip to be swapped.

To swap the stored contents of the write block of the write target flash EEPROM and the block to be swapped of the chip to be swapped, the firmware performs a write access by which the contents of the block to be swapped which are read out into the RAM 13 are written into the write block of the write target flash EEPROM, and a write access by which the write data of one block stored in the RAM 13 is written into the block to be swapped of the flash EEPROM to be swapped. Thereafter, to update the MBI table block of each of the write target flash EEPROM and the flash EEPROM to be swapped, the firmware performs a write access by which the contents of the updated MBI table block stored in the RAM 13 are written into the MBI table block of the write target flash EEPROM, and a write access by which the contents of the updated MBI table block stored in the RAM 13 are written into the MBI table block of the flash EEPROM to be swapped. These four write accesses are implemented in a form analogous to that explained in step A85.

As described above, the swap processing is executed in a chip or between chips. In the swap processing between chips, each of the read access operation and the write access operation needs to be performed a number of times which is larger by one than that in the swap processing in a chip.

In this embodiment, however, the threshold value ($\alpha+\beta$) by which whether swapping is to be performed is determined is set to be larger than the threshold value ($\alpha$) used to determine execution of the swap processing in a chip. Consequently, the frequency of the swapping between chips can be decreased to be lower than the frequency of the swapping in a chip. This makes it possible to prevent performance from degradation resulting when the swapping between chips occurs frequently.

If the difference between the write counts is smaller than the predetermined threshold value in both of steps A89 and A91, the firmware performs a write access by which the MBI table block containing the UWC data updated in step A87 is written into the write target flash EEPROM (step A93). The firmware then executes a write access to the write block. These write accesses are done in a form similar to that explained in step A85.

As described above, if no carry occurs in the LWC data the write access processing is immediately performed without checking the need for the swap processing. Consequently, the overall time required for the data write can be shortened compared to that when a carry takes place.

The value of LWC data is incremented by one from its initial value each time a write access is performed, and a carry occurs when the value reaches 1K. Therefore, it is preferable to use discrete values different from one another, rather than the same value, as the initial values of LWC data that are written in all blocks contained in the flash EEPROMs 11-1 to 11-16 in the manufacture or the shipment of a disk. In this case, the timing at which a carry occurs differs from one block to another even if write accesses to continuous blocks are successively performed. This makes it possible to prevent the concentrated occurrence of the swap determination processing and the swap processing resulting from a carry.

In this embodiment, a write to one write block has been described. If write data is stored across a plurality of continuous write blocks, write accesses to these blocks are executed as parallel processing. This parallel processing is effectuated by use of write access control processing, called a write channel, which is the characteristic feature of the present invention.

Figure 24:
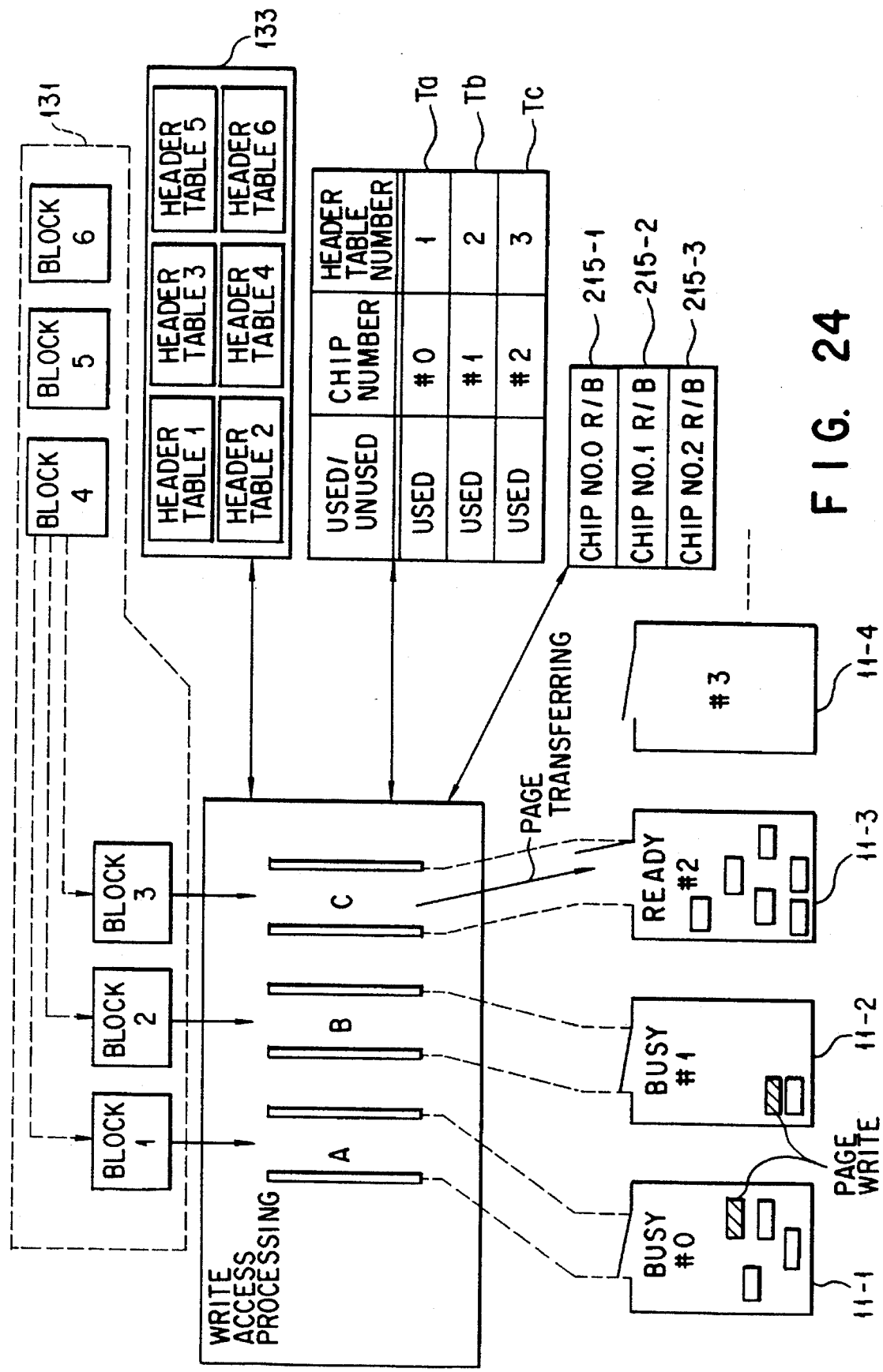
FIG. 24 is a block diagram for explaining the operation principle of write access control using write channels, which is executed to simultaneously write-access a plurality of flash EEPROMs in the semiconductor disk system in FIG. 2.

The principle of the write access control processing using the write channel will be described below with reference to FIG. 24.

If the write destination of write data requested by the host system exists across a plurality of write blocks, the processing from step A76 to step A79 in FIG. 23 is executed for each of these write blocks, and a plurality of block data (header tables) are sequentially generated. As mentioned earlier, sector numbers are allocated across the flash EEPROMs 11-1 to 11-16 so that access target chips can be switched in units of 8 sectors. Therefore, the plurality of block data are written into different chips.

The block data thus generated are allocated to three write channels (A, B, and C). Each of these write channels A, B, and C is a logical write control path for relating block data to a flash EEPROM. These write channels A, B, and C are realized by write channel management tables Ta, Tb, and Tc, respectively, as in FIG. 24.

Each of these write channel management tables Ta, Tb, and Tc registers information indicating the used/unused state of a corresponding write channel, a chip number address indicating a flash EEPROM as a write access target, and a header table number corresponding to block data to be written.

Assume that block data 1 to 6 are sequentially generated and these block data 1 to 6 are to be written into the flash EEPROMs 11-1 to 11-6.

These generated block data 1 to 6 are registered in a generation order in write channels left unused at that time. If the write channels A, B, and C are unused, block data 1 is registered in the write channel A, block data 2 is registered in the write channel B, and block data 3 is registered in the write channel C.

In the write channel management table Ta corresponding to the write channel A, information indicating "used" is set, and a chip number address representing the flash EEPROM 11-1 and a header table number indicative of header table 1 which corresponds to block data 1 are stored. Likewise, in the write channel management table Tb corresponding to the write channel B, information indicating "used" is set, and a chip number address indicative of the flash EEPROM 11-2 and a header table number representing header table 2 corresponding to block data 2 are stored. Also, in the write channel management table Tc which corresponds to the write channel C, information indicating "used" is set, and a chip number address indicating the flash EEPROM 11-3 and a header table number representing header table 3 corresponding to block data 3 are stored.

When the write channel tables Ta, Tb, and Tc are formed in this way, the firmware implements the following write access control according to the contents of these tables Ta, Tb, and Tc.

That is, the firmware first performs write access processing through the write channel A. In this write access processing, the firmware checks by referring to the NAND chip ready/busy status register 215-1 whether the flash EEPROM 11-1 designated by the chip address number of the table Ta is in the ready state.

If the chip is in the ready state, the firmware refers to header table 1 designated by the table Ta. In accordance with the contents of header table 1, the firmware transfers data of one page from the data buffer 131 to the flash EEPROM 11-1 and issues a write command to the flash EEPROM 11-1. Accordingly, the flash EEPROM 11-1 is switched from the ready state to the busy state and executes a page write operation.

Upon switching the flash EEPROM 11-1 from the ready state to the busy state, the firmware starts write access processing through the write channel B.

In this write access processing, the firmware checks by referring to the NAND chip ready/busy status register 215-2 whether the flash EEPROM 11-2 designated by the chip address number of the table Tb is in the ready state. If the chip is in the ready state, the firmware refers to header table 2 designated by the table Tb. In accordance with the contents of header table 2, the firmware transfers data of one page from the data buffer 131 to the flash EEPROM 11-2 and issues a write command to the flash EEPROM 11-2. Accordingly, the flash EEPROM 11-2 is switched from the ready state to the busy state and executes a page write operation.

Upon switching the flash EEPROM 11-2 from the ready state to the busy state, the firmware starts write access processing through this time the write channel C. In this write access processing, the firmware checks by referring to the NAND chip ready/busy status register 215-3 whether the flash EEPROM 11-3 designated by the chip address number of the table Tc is in the ready state.

If the chip is in the ready state, the firmware refers to header table 3 designated by the table Tc. In accordance with the contents of header table 3, the firmware transfers data of one page from the data buffer 131 to the flash EEPROM 11-3 and issues a write command to the flash EEPROM 11-3. Accordingly, the flash EEPROM 11-3 is switched from the ready state to the busy state and executes a page write operation.

Upon switching of the flash EEPROM 11-3 from the ready state to the busy state, the firmware returns to the control of the write channel A and performs write access processing through the write channel A. In this write access processing, as in the previous processing, the firmware checks whether the flash EEPROM 11-1 designated by the chip number address of the table Ta is in the ready state, i.e., whether the page write access is completed. If the page write access is completed, the firmware refers to header table 1 designated by the table Ta, and, in accordance with the contents of header table 1, transfers data of the next page from the data buffer 131 to the flash EEPROM 11-1 and issues a write command to the flash EEPROM 11-1.

On the other hand, if the flash EEPROM 11-1 is in the busy state because the chip is still executing the page write, the firmware transits from the control of the write channel A to the control of the write channel B, starting write access processing through the write channel B. In this write access processing, the firmware checks whether the flash EEPROM 11-2 designated by the chip number address of the table Tb is in the ready state, i.e., whether the page write is completed. If the page write is completed, the firmware refers to header table 2 designated by the table Tb, and, in accordance with the contents of header table 2, transfers data of the next page from the data buffer 131 to the flash EEPROM 11-2 and issues a write command to the flash EEPROM 11-2.

On the other hand, if the flash EEPROM 11-2 is in the busy state because the chip is still executing the page write, the firmware transits from the control of the write channel B to the control of the write channel C, starting write access processing through the write channel C. In this write access processing, the firmware checks whether the flash EEPROM 11-3 designated by the chip number address of the table Tc is in the ready state, i.e., whether the page write is completed. If the page write is completed, the firmware refers to header table 3 designated by the table Tc, and, in accordance with the contents of header table 3, transfers data of the next page from the data buffer 131 to the flash EEPROM 11-3 and issues a write command to the flash EEPROM 11-3.

If the flash EEPROM 11-3 is in the busy state because the chip is still executing the page write, the firmware again transits from the control of the write channel C to the control of the write channel A, starting write access processing through the write channel A.

In this way, the firmware searches the write channel tables Ta, Tb, and Tc in this order and executes the succeeding page write operation from the chip which has completed the preceding page write.

Even if, therefore, the time required for a page write access differs from one write target chip to another due to the difference in the performance between the flash EEPROMs or the difference in the number of page write operations retried by page write verify, it is possible to bring out the maximum write performance of each chip. Consequently, write accesses can be executed at a high speed.

When write accesses to all pages of given block data are completed, the write channel in which this block data is registered is emptied, and the next write block (in this case, block data 4) is registered in that empty channel.

As an example, if the write to block data 3 through the channel C is completed earliest of all, block data 4 is registered in this channel C. In this case, the chip number address of the write channel table Tc is changed from the address indicating the flash EEPROM 11-3 to the address indicating the flash EEPROM 11-4, and the header table number is also changed from 3 to 4. Thereafter, write access processing for the flash EEPROM 11-4 through the write channel C is performed in parallel with the write access processing for the flash EEPROMs 11-1 and 11-2 through the write channels A and B.

Note that not only blocks containing user data but MBI blocks are registered in the write channels A, B, and C. Consequently, even if a write access of the MBI table block is required as a result of the swap determination processing or the swap processing, this write operation can be performed at a high speed in parallel with a user data write access.

Note also that although three write channels are used in this embodiment, the number of write channels is determined by a maximum number of chips that can be operated at the same time. This maximum number of simultaneously operable chips is previously defined by the configuration information in order to restrict the maximum power consumption of the semiconductor disk system 10. It is, of course, possible to dynamically alter the maximum number of simultaneously operable chips by rewriting the configuration information in accordance with a request from the host system.

As described above, in this embodiment, 16 ready/busy signals from the flash EEPROMs 11-1 to 11-16 are received independently of each other, so it is possible to separately manage the operating states of the individual flash EEPROMs. Consequently, a write access to a flash EEPROM as a write access target can be started immediately after this write access target flash EEPROM is set in the ready state, without waiting for completion of operations of all the flash EEPROMs 11-1 to 11-16. Also, each flash EEPROM used in this semiconductor disk system 10 is of a command control type capable of automatically executing a write operation. Therefore, once the firmware issues a write command to a flash EEPROM, the firmware is released from the write control operation after that. Consequently, it is possible to perform a write access to a given flash EEPROM while a data write is being performed for another flash EEPROM. This makes parallel operations of a plurality of flash EEPROMs feasible. Accordingly, the data write rate can be improved.

Additionally, consecutive sector numbers are allocated across the flash EEPROMs 11-1 to 11-16. Therefore, if the host system requests a write access of write data across successive sectors, it is possible to cause a plurality of flash EEPROMs to execute this data write access. This makes a more efficient write operation possible.

Furthermore, the use of the write channels A, B, and C makes it possible to start the succeeding page write operation from a chip that has completed the preceding page write operation. Consequently, even if the time required for a page write access differs from one chip to another, it is possible to bring out the maximum write performance of each built-in chip.

Assume, for example, that the post system sends write data to the semiconductor disk system 10 sequentially in units of sectors, and so the system 10 performs a one-sector sequential write. In this case, if no cache is provided in the semiconductor disk system 10, the data write rate which is conventionally 0.04 Mbyte/s can be increased to 0.7 Mbyte/s. In a sequential write according to 16 sectors, if no cache is provided in the semiconductor disk system 10, the data write rate which is 0.6 Mbyte/s can be increased to 1.2 Mbyte/s, since a parallel (simultaneous) performing of a plurality of flash EEPROMs can be optimized.

As has been described above, in this embodiment the ECC calculating circuit 21 generates ECC data for each page, and this ECC data is written in the same page as a data string which is an object of the ECC calculation. Therefore, even if abnormal cells are produced at the same bit position in a plurality of pages of a flash EEPROM, only one abnormal cell is included in the data string as an object of the ECC calculation. This makes it possible to perform error detection and correction by a regular simple ECC calculation without using any complicated ECC arithmetic expression with a high data recovery capability. Consequently, it is possible to realize a semiconductor disk system which has a high storage reliability and can be accessed at a high speed.

Also, in the redundancy area of the first page of each block the LWC data as write count information corresponding to that block is stored. The value of this LWC data is updated in performing a data write access to a write target block. The updated LWC data is added to write data to be written into the first page and transferred to the data register 112 of the flash EEPROM. Since the LWC data is managed in each block in this way, both the data write and the updating of the LWC data can be performed only by a write access to the same block. The result is an improvement in the write access performance.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A semiconductor disk system comprising:

a plurality of flash memories each having a memory cell array constituted by a plurality of blocks, each consisting of a plurality of pages, each of said flash memories automatically executing page write processing for writing data of one of said pages into said memory cell array in response to a write command and generating a ready/busy signal indicating a busy state during the page write processing;

a memory for storing write data transferred from a host system;

setting means for setting, on the basis of the write data, block data to be written into individual said blocks of said flash memories designated by a write access request from said host system, said setting means including:

determining means for determining, for each said designated block, whether a write area requested to perform a data write access is smaller than an overall data write area in said designated block, and block data setting means for setting the block data by using data to be stored in a non-write area of said designed block and the write data, if said determining means determines that the write area is smaller than the overall data write area, data transfer means for transferring one said page of the block data set by said setting means to said flash memories designated by the write access request and issuing a write command;

detecting means for detecting completion of the page write access of each of said flash memories to which the data is transferred by said data transfer means, in accordance with the ready/busy signals generated from said flash memories; and control means for controlling said data transfer means in accordance with the page write access completion detected by said detecting means, such that the set block data is entirely transferred.

2. A semiconductor disk system comprising:

a plurality of flash memories each having a memory cell array constituted by a plurality of blocks, each consisting of a plurality of pages, each of said flash memories automatically executing page write processing for writing data of one of said pages into said memory cell array in response to a write command and generating a ready/busy signal indicating a busy state during the page write processing;

a memory for storing write data transferred from a host system;

setting means for setting, on the basis of the write data, block data to be written into individual said blocks of said flash memories designated by a write access request from said host system;

data transfer means for transferring one said page of the block data set by said setting means to said flash memories blocks designated by the write access request and issuing a write command, said data transfer means includes a predetermined number of channel means for transferring the set block data to said flash memories, and executes data transfer by allocating a predetermined number of flash memories of said designated flash memories blocks to said channel means;

detecting means for detecting completion of the page write access of each of said flash memories to which the data is transferred by said data transfer means, in accordance with the ready/busy signals generated from said flash memories; and control means for controlling said data transfer means in accordance with the page write access completion detected by said detecting means, such that the set block data is entirely transferred, said control means controls said data transfer means in response to completion of the transfer of given block data, such that a flash memory to which the block data has not been transferred is allocated to channel means to which a flash memory which has completed the transfer of the block data is allocated.

3. A system according to claim 2, further comprising:

second setting means for, if said block designated by a first write access from said host system equals said block designated by a previously issued second write access request and if data transfer to said block designated by the second write access request has not been completed, setting new block data on the basis of write data corresponding to the first write access request and block data set by said setting means in response to the second write access request.

4. A semiconductor disk system comprising:

a flash memory having a memory cell array consisting of a plurality of pages each including a data storage area and a redundancy area, and a data register for holding data of said one said page, data transfer between said data register and said memory cell array being executed in units of pages;

a data buffer for storing write data transferred from a host system and read data read out from said flash memory;

error correction code generating means for performing, in response to a write request from said host system, a calculation for the write data stored in said data buffer in units of data strings each said corresponding to a size of the data storage area of each said page, thereby generating an error correction code for each data string; and write access means for adding a corresponding error correction code to each data string, in order that each data string and an error correction code corresponding to the data string are written into the data storage area and the redundancy area, respectively, of the same said page, and transferring the data string and the error correction code to said data register, thereby performing a write access to said flash memory.

5. A system according to claim 4, further comprising:

error correction code calculating means for performing a read access to said flash memory in response to a read request from said host system, calculating an error correction code for each said page to be read out, and executing error detection and correction for each data string of each said page.

6. A system according to claim 4, further comprising:

writing means for writing bad sector information indicating a bad sector designated by said host system into the redundancy area of one of said pages of said flash memory which corresponds to the bad sector.

7. A system according to claim 4, further comprising:

writing means for writing error information indicating an ECC error sector designated by said host system into the redundancy area of one of said pages of said flash memory which corresponds to the error sector.

8. A system according to claim 4, further comprising:

a ROM which stores a program to be executed by said host system and to which the program is transferred in response to a read request for a predetermined address from said host system.

9. A system according to claim 4, wherein said flash memory is constituted by an EEPROM (Electrically Erasable and Programmable Read-Only Memory).

10. A semiconductor disk system comprising:

a flash memory having a memory cell array consisting of a plurality of pages each including a data storage area and a redundancy area, and a data register for holding data of one said page, data transfer between said data register and said memory cell array being executed in units of said pages;

a microprocessor;

a data buffer for storing write data transferred from a host system and read data read out from said flash memory;

a flash memory interface circuit, controlled by said microprocessor, for performing a read/write access to said flash memory; and an I/O registers set capable of being read/written by said microprocessor, wherein said flash memory interface circuit includes an error correction code generation circuit for performing a calculation for write data which is read out by said microprocessor from said data buffer in units of data strings each corresponding to a size of the data storage area of each said page, thereby generating an error correction code for each data string, a write data transfer circuit for adding a corresponding error correction code to each data string, in order that each data string and an error correction code corresponding to the data string are written into the data storage area and the redundancy area, respectively, of the same said page, and transferring the data string and the error correction code to said data register of said flash memory, a read data transfer circuit for extracting the data string stored in the data storage area from the read data read out from said data register of said flash memory, and transferring the extracted data string to said data buffer, an error correction code check circuit for executing error detection for the read data by using the error correction code contained in the read data, and setting the detection result in said I/O register, and said microprocessor is so programmed as to execute error correction for the read data transferred to said data buffer in accordance with the calculation result set in said I/O register.

11. A system according to claim 10, wherein said flash memory is an EEPROM flash memory.

12. A semiconductor disk system comprising:

a flash memory having a memory cell array which includes a plurality of blocks, each said block consisting of a plurality of pages, each said page including a data storage area and a redundancy area, and in which write count information indicative of a write count of each said block is stored in the redundancy area of a predetermined said page of each said block, and a data register for holding data of one said page, data transfer between said data register and said memory cell array being executed in units of said pages, and an erase operation being executed in units of said blocks;

a data buffer for storing write data transferred from a host system and read data read out from said flash memory;

updating means for reading out the write count information from said predetermined page of a write target block which is designated by a write request from said host system, and updating a value of the write count information; and write access means for generating page data by adding the updated write count information to write data to be written into said predetermined page, and transferring the page data to said data register of said flash memory such that the write data and the updated write count information are stored in the data storage area and the redundancy area, respectively, of said predetermined page, thereby performing a write access to said flash memory.

13. A system according to claim 12, wherein said flash memory is an EEPROM flash memory.

14. A semiconductor disk system comprising:

a flash memory having a memory cell array which includes a plurality of blocks, each said block consisting of a plurality of pages, each said page including a data storage area and a redundancy area, and in which write count data constituted by an upper bit portion of write count data indicative of a write count of each said block is stored in a predetermined said block, and second write count data constituted by a lower bit portion of write count data corresponding to each said block is stored in the redundancy area of a predetermined said page of each said block, and a data register for holding data of one said page, said flash memory being set, in response to a command, in one of an erase operation mode by which stored contents are erased in units of said blocks, a write operation mode by which data is written in said memory cell array in units of said pages, and a read operation mode by which data is read out from said memory cell array in units of said pages;

a data buffer for storing write data transferred from a host system and read data read out from said flash memory;

write count managing means for setting said flash memory in the read operation mode by issuing a read command, reading out the first write count data from said predetermined block, and managing the write count of each said block of said flash memory in accordance with the readout first write count data;

updating means for setting said flash memory in the read operation mode by issuing a read command, reading out the second write count data from said predetermined page of a write target block designated by a write request, and updating a value of the readout second write count data;

header table generating means for reading out data stored in a target page other than a write access target page of said write target block into said data buffer, and, on the basis of an address of the readout data in said data buffer and an address of the write data stored in said data buffer, generating a header table which holds address information indicating a storage position, in said data buffer, of each data constituting block data of one said block to be written into said write target block;

erasing means for setting said flash memory in the erase operation mode by issuing an erase command, and erasing stored contents of said write target block; and write access means for reading out the block data in said units of said pages from said data buffer by referring to the address information of said header table, and transferring the readout data to said data register, thereby performing a write access to said flash memory, wherein said write count managing means includes updating means for updating a value of the first write count data corresponding to said write target block, if a carry occurs from the second write count data to the first write count data upon updating the second write count data.

15. A system according to claim 14, wherein said write count managing means includes determining means for, if the value of the first write count data of said write target block is updated, determining that said block whose write count has a difference reaching a predetermined value from the write count of said write target block is to be used as a swapping destination block, and swapping means for swapping block addresses and stored contents of said write target block and said swapping destination block.

16. A system according to claim 14, wherein as an initial value of the second write count data, a discrete value is stored beforehand in the redundancy area of said predetermined page of each said block.

17. A system according to claim 14, wherein said predetermined block stores a swapping table which holds minimum write count information indicating a minimum value of the first write count data of said plurality of blocks and priority information indicating a priority order of plural said swapping destination blocks in accordance with the value of the first write count data, and said write count managing means includes determining means for, if the value of the first write count data of said write target block is updated, comparing the write count of said write target block with the value of the minimum write count information in said swapping table, and determining whether a difference between the write counts reaches a predetermined value, and swapping means for, if the difference between the write counts reaches the predetermined value, determining a swapping destination block with a highest priority by referring to the priority information in said swapping table, and swapping block addresses and stored contents of said write target block and said swapping destination block with the highest priority.

18. A system according to claim 14, wherein said flash memory is an EEPROM flash memory.

19. A semiconductor disk system comprising:

a flash memory having a memory cell array which includes a plurality of blocks, each said block consisting of a plurality of pages, each said page including a data storage area and a redundancy area, and in which write count information indicating a write count of each said block is stored in the redundancy area of a predetermined one of said pages of each said block, and a data register for holding data of one said page, said flash memory being set, in response to an external command, in one of an erase operation mode by which stored contents are erased in units of said blocks, a write operation mode by which data is written in units of said pages in said memory cell array, and a read operation mode by which data is read out in units of said pages from said memory cell array;

a data buffer for holding write data transferred from a host system and read data read out from said flash memory;

updating means for setting said flash memory in the read operation mode by issuing a read command, reading out the write count information from said predetermined page of a write target block designated by a write request, and updating a value of the readout write count information;

header table generating means for, if a target page other than a write access target page exists in said write target block, reading out data stored in said target page other than said write access target page into said data buffer, and, on the basis of an address of the readout data in said data buffer and an address of the write data stored in said data buffer, generating a header table which holds address information indicating a storage position, in said data buffer, of each data constituting block data of one of said blocks to be written into said write target block;

erasing means for setting said flash memory in the erase operation mode by issuing an erase command, and erasing stored contents of said write target block;

first access means for reading out write data to be written into said predetermined page from said data buffer by referring to the address information in said header table, generating page data by adding the updated write count information to the readout write data, and transferring the page data to said data register such that the write data and the updated write count information are stored in the data storage area and the redundancy area, respectively, of said predetermined page, thereby performing a write access to said flash memory; and second access means for sequentially reading out write data to be written into said pages other than said predetermined page from said data buffer by referring to the address information in said header table, and transferring the read out write data to said data register, thereby performing a write access to said flash memory.

20. A system according to claim 19, further comprising:

reading means for sequentially reading out the block data in units of data strings each corresponding to a size of the data storage area from said data buffer by referring to the address information in said header table; and error correction code generating means for generating an error correction code for each data string read out from said data buffer, and wherein said first access means generates page data by adding, to a data string to be written into said predetermined page, an error correction code corresponding to the data string and the updated write count information, and transfers the generated page data to said data register such that the data string is stored in the data storage area of said predetermined page and the updated write count information and the error correction code are stored in the redundancy area of said predetermined page, thereby performing a write access to said flash memory, and said second access means generates page data by adding a corresponding error correction code to a data string to be written into each page other than said predetermined page, and transfers the generated page data to said data register such that the data string and the error correction code are stored in the data storage area and the redundancy area, respectively, of the corresponding page, thereby performing a write access to said flash memory.

21. A system according to claim 20, wherein said flash memory is an EEPROM flash memory.

22. An access control method in a semiconductor disk system which comprises a plurality of flash memories each having a memory cell array constituted by a plurality of blocks, each said block consisting of a plurality of a plurality of pages, each of said flash memories automatically executing page write processing for writing data of one of said pages into said memory cell array in response to a write command and generating a ready/busy signal indicating a busy state during the page write processing, and a memory for storing write data transferred from a host system, comprising the steps of:

a) setting, on the basis of the write data, block data to be written into individual said blocks of said flash memories designated by a write access request from said host system, said setting step including the substeps of:

determining, for each said designated block, whether a write area requested to perform a data write access is smaller than an overall data write area in each said designated block, and setting the block data by using data to be stored in a non-write area of each said designated block and the write data, if the determination substep determines that the write area is smaller than the overall data write area;

b) transferring one page of the block data set in the step a) to said flash memories designated by the write access request and issuing a write command;

c) detecting completion of the page write access of each of said flash memories to which the data is transferred in the step b), in accordance with the ready/busy signals generated from said flash memories; and d) controlling the step b) in accordance with the page write access completion detected in the step c), such that the set block data is entirely transferred.

23. An access control method in a semiconductor disk system which comprises a plurality of flash memories each having a memory cell array constituted by a plurality of blocks, each said block consisting of a plurality of a plurality of pages, each of said flash memories automatically executing page write processing for writing data of one of said pages into said memory cell array in response to a write command and generating a ready/busy signal indicating a busy state during the page write processing, and a memory for storing write data transferred from a host system, comprising the steps of:

a) setting, on the basis of the write data, block data to be written into individual said blocks of said flash memories designated by a write access request from said host system, said semiconductor disk system including a predetermined number of channel means for transferring the set block data to said flash memories;

b) transferring one page of the block data set in the step a) to said flash memories designated by the write access request by allocating a predetermined number of flash memories of said designated flash memories to said channel means, and issuing a write command;

c) detecting completion of the page write access of each of said flash memories to which the data is transferred in the step b), in accordance with the ready/busy signals generated from said flash memories; and d) controlling the step b) in accordance with the page write access completion detected in the step c), such that the set block data is entirely transferred, said controlling step acting in response to completion of the transfer of given block data, such that a flash memory to which the block data has not been transferred is allocated to channel means to which a flash memory which has completed the transfer of the block data is allocated.

24. A method according to claim 23, further comprising the step of:

if one of said blocks designated by a first write access from said host system equals another of said blocks designated by a previously issued second write access request and if data transfer to said another block designated by the second write access request has not been completed, setting new block data on the basis of write data corresponding to the first write access request and block data set by the setting substep in response to the second write access request.

25. A data hold control method in a semiconductor disk system which comprises a flash memory having a memory cell array consisting of a plurality of pages, each including a data storage area and a redundancy area, and a data register for holding data of one page, data transfer between said data register and said memory cell array being executed in units of said pages, and a data buffer for storing write data transferred from a host system and read data read out from said flash memory, comprising the steps of:
  a) in response to a write request from said host system, performing a calculation for the write data stored in said data buffer in units of data strings, each corresponding to a size of the data storage data of each said page, thereby generating an error correction code for each data string; and
  b) adding a corresponding error correction code to each said data string, in order that each said data string and an error correction code corresponding to each said data string are written into the data storage area and the redundancy area, respectively, of a corresponding one of said pages, and transferring the data string and the error correction code of the corresponding said page to said data register, thereby performing a write access to said flash memory.

26. A method according to claim 25, further comprising the step of:
  performing a read access to said flash memory in response to a read request from said host system, calculating an error correction code for each said page to be read out, and executing error detection and correction for each said data string of each said page.

27. A method according to claim 25, further comprising the step of:
  writing bad sector information indicating a bad sector designated by said host system into the redundancy area of one of said pages of said flash memory which corresponds to the bad sector.

28. A method according to claim 25, further comprising the step of:
  writing error information indicating an ECC error sector designated by said host system into the redundancy area of one of said pages of said flash memory which corresponds to the error sector.

29. An access control method in a semiconductor disk system which comprises a flash memory having a memory cell array which includes a plurality of blocks, each said block consisting of a plurality of pages, each said page including a data storage area and a redundancy area, and in which write count information indicative of a write count of each said block is stored in the redundancy area of a predetermined one of said pages of one of said blocks, and a data register for holding data of one of said pages, data transfer between said data register and said memory cell array being executed in units of said pages, and an erase operation being executed in units of said blocks, and a data buffer for storing write data transferred from a host system and read data read out from said flash memory, comprising the steps of:
  a) reading out the write count information from a predetermined page of a write target block which is designated by a write request from said host system, and updating a value of the write count information;
  b) generating page data by adding the updated write count information to write data to be written into said predetermined page; and
  c) transferring the page data to said data register of said flash memory such that the write data and the updated write count information are stored in the data storage area and the redundancy area, respectively, of said predetermined page, thereby performing a write access to said flash memory.

30. An access control method in a semiconductor disk system which comprises a flash memory having a memory cell array which includes a plurality of blocks, each said block consisting of a plurality of pages, each said page including a data storage area and a redundancy area, and in which first write count data constituted by an upper bit portion of write count data indicative of a write count of each said block is stored in a predetermined one of said blocks, and second write count data constituted by a lower bit portion of write count data corresponding to each said block is stored in the redundancy area of a predetermined page of said predetermined block, and a data register for holding data of one said page, said flash memory being set, in response to a command, in one of an erase operation mode by which stored contents are erased in units of said blocks, a write operation mode by which data is written in said memory cell array in units of said pages, and a read operation mode by which data is read out from said memory cell array in units of said pages, and a data buffer for storing write data transferred from a host system and read data read out from said flash memory, comprising the steps of:
  a) setting said flash memory in read operation mode by issuing a read command, reading out the first write count data from said predetermined block, and managing the write count of each said block of said flash memory in accordance with the readout first write count data;
  b) setting said flash memory in the read operation mode by issuing a read command, reading out the second write count data from a predetermined page of a write target block designated by a write request, and updating a value of the readout second write count data;
  c) reading out data stored in a target page other than a write access target page of said write target block into said data buffer, and, on the basis of an address of the readout data in said data buffer and an address of the write data stored in said data buffer, generating a header table which holds address information indicating a storage position, in said data buffer, of each data constituting block data of one of said blocks to be written into said write target block;
  d) setting said flash memory in the erase operation mode by issuing an erase command, and erasing stored contents of said write target block; and
  e) reading out the block data in units of said pages from said data buffer by referring to the address information of said header table, and transferring the read out data to said data register, thereby performing a write access to said flash memory,
  wherein the step a) includes the step of updating a value of the first write count data corresponding to said write target block, if a carry occurs from the second write count data to the first write count data upon updating the second write count data.

31. A method according to claim 30, wherein the step a) includes the steps of
  if the value of the first write count data of said write target block is updated, determining that one said block whose write count has a difference reaching a predetermined value from the write count of said write target block is to be used as a swapping destination block, and
  swapping block addresses and stored contents of said write target block and said swapping destination block.

32. A method according to claim 31, further comprising the step of:
  storing a discrete value beforehand in the redundancy area of said predetermined page of each said block, as an initial value of the second write count data.

33. A method according to claim 30, wherein said predetermined block stores a swapping table which holds minimum write count information indicating a minimum value of the first write count data of said plurality of blocks and priority information indicating a priority order of swapping destination blocks in accordance with the value of the first write count data, and the step a) includes the steps of if the value of the first write count data of said write target block is updated, comparing the write count of said write target block with the value of the minimum write count information in said swapping table, and determining whether a difference between the write counts reaches a predetermined value, and if the difference between the write counts reaches a predetermined value, determining a swapping destination block with a highest priority by referring to the priority information in said swapping table, and swapping block addresses and stored contents of said write target block and said swapping destination block with the highest priority.

34. An access control method in a semiconductor disk system which comprises a flash memory having a memory cell array which includes a plurality of blocks, each said block consisting of a plurality of pages, each said page including a data storage area and a redundancy area, and in which write count information indicating a write count of each said block is stored in the redundancy area of a predetermined page of each said block, and a data register for holding data of one said page, said flash memory being set, in response to an external command, in one of an erase operation mode by which stored contents are erased in units of said blocks, a write operation mode by which data is written in units of said pages in said memory cell array, and a read operation mode by which data is read out in units of said pages from said memory cell array, and a data buffer for holding write data transferred from a host system and read data read out from said flash memory, comprising the steps of:

a) setting said flash memory in the read operation mode by issuing a read command, reading out the write count information from a predetermined page of a write target block designated by a write request, and updating a value of the read out write count information;

b) if a target page other than a write access target page exists in said write target block, reading out data stored in said target page other than said write access target page into said data buffer, and, on the basis of an address of the readout data in said data buffer and an address of the write data stored in said data buffer, generating a header table which holds address information indicating a storage position, in said data buffer, of each data constituting block data of one of said blocks to be written into said write target block;

c) setting said flash memory in the erase operation mode by issuing an erase command, and erasing stored contents of said write target block;

d) reading out write data to be written into said predetermined page from said data buffer by referring to the address information in said header table, generating page data by adding the updated write count information to the readout write data, and transferring the page data to said data register such that the write data and the updated write count information are stored in the data storage area and the redundancy area, respectively, of said predetermined page, thereby performing a write access to said flash memory; and e) sequentially reading out write data to be written into said pages other than said predetermined page from said data buffer by referring to the address information in said header table, and transferring the read out write data to said data register, thereby performing a write access to said flash memory.

35. A method according to claim 34, further comprising the steps of:

f) sequentially reading out the block data in units of data strings each corresponding to a size of the data storage area from said data buffer by referring to the address information in said header table; and g) generating an error correction code for each data string read out from said data buffer, and wherein the step d) generates page data by adding, to a data string to be written into said predetermined page, an error correction code corresponding to the data string and the updated write count information, and transfers the generated page data to said data register such that the data string is stored in the data storage area of said predetermined page and the updated write count information and the error correction code are stored in the redundancy area of said predetermined page, thereby performing a write access to said flash memory, and the step e) generates page data by adding a corresponding error correction code to a data string to be written into each said page other than said predetermined page, and transfers the generated page data to said data register such that the data string and the error correction code are stored in the data storage area and the redundancy area, respectively, of the corresponding page, thereby performing a write access to said flash memory.

* * * * *

UNITED STATES PATENT AND TRADEMARK OFFICE
CERTIFICATE OF CORRECTION

PATENT NO. : 5,603,001
DATED : February 11, 1997
INVENTOR(S) : Hiroshi SUKEGAWA et al.

It is certified that error appears in the above-indentified patent and that said Letters Patent is hereby corrected as shown below:

Claim 4, column 43, line 16, after "units of", insert --said--.

Claim 15, column 45, line 64, before "said block", insert --one--.

Claim 28, column 49, line 36, "by-said" should read --by said--.

Signed and Sealed this

Twenty-eighth Day of October, 1997

Attest:

BRUCE LEHMAN

Attesting Officer

Commissioner of Patents and Trademarks